United States Patent
Zhou et al.

(10) Patent No.: US 12,113,739 B2
(45) Date of Patent: Oct. 8, 2024

(54) WIRELESS COMMUNICATION METHOD AND APPARATUS

(71) Applicant: HUAWEI TECHNOLOGIES CO., LTD., Guangdong (CN)

(72) Inventors: Guohua Zhou, Shanghai (CN); Junchao Li, Shanghai (CN); Hao Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 626 days.

(21) Appl. No.: 17/323,751

(22) Filed: May 18, 2021

(65) Prior Publication Data

US 2021/0273756 A1  Sep. 2, 2021

Related U.S. Application Data

(63) Continuation of application No. PCT/CN2019/119200, filed on Nov. 18, 2019.

(30) Foreign Application Priority Data

Nov. 19, 2018 (CN) .......................... 201811378745.6

(51) Int. Cl.
*H04W 72/04* (2023.01)
*H04L 5/00* (2006.01)
(Continued)

(52) U.S. Cl.
CPC ............ *H04L 5/005* (2013.01); *H04W 16/28* (2013.01); *H04W 72/0453* (2013.01); *H04W 72/1268* (2013.01)

(58) Field of Classification Search
CPC ..... H04W 52/24; H04W 56/00; H04W 16/28; H04W 36/00; H04W 64/00; H04W 72/04;
(Continued)

(56) References Cited

U.S. PATENT DOCUMENTS 9,859,972 B2   1/2018 Jalali
10,129,004 B2  11/2018 Montaigne et al.
(Continued)

FOREIGN PATENT DOCUMENTS

CN   101137185 A   3/2008
EP     2334122 A1   6/2011
(Continued)

OTHER PUBLICATIONS

3GPP TR 22.891 V0.2.0 (Aug. 2015), 3rd Generation Partnership Project; Technical Specification Group Services and System Aspects; Feasibility Study on New Services and Markets Technology Enablers; Stage 1(Release 14), 73 pages.
(Continued)

*Primary Examiner* — Tu X Nguyen
(74) *Attorney, Agent, or Firm* — WOMBLE BOND DICKINSON (US) LLP

(57) ABSTRACT

This application provides a wireless communication method and apparatus. The method includes: A second network device sends, to a first terminal device and at least one network device, first indication information used to indicate to send a common pilot signal on a common transmission resource, so that the first terminal device sends the common pilot signal to the at least one network device on the common transmission resource, and each network device receives and demodulates the common pilot signal, and adjusts a receive beam in a direction of the first terminal device based on the common pilot signal.

14 Claims, 7 Drawing Sheets

(51) Int. Cl.
*H04W 16/28* (2009.01)
*H04W 72/0453* (2023.01)
*H04W 72/1268* (2023.01)

(58) Field of Classification Search
CPC . H04W 88/06; H04W 72/0446; H04W 72/21; H04W 72/1268; H04W 24/10; H04W 72/232; H04W 36/28; H04W 72/50; H04W 72/543; H04W 12/63
See application file for complete search history.

(56) References Cited

U.S. PATENT DOCUMENTS

| | | | | |
|---|---|---|---|---|
| 2007/0230388 | A1* | 10/2007 | Li | H04J 11/005 |
| | | | | 370/313 |
| 2015/0236779 | A1 | 8/2015 | Jalali | |
| 2016/0204921 | A1 | 7/2016 | Kim et al. | |
| 2017/0373807 | A1* | 12/2017 | Hessler | H04L 5/0091 |
| 2019/0313314 | A1* | 10/2019 | Yang | H04W 24/08 |

FOREIGN PATENT DOCUMENTS

| | | | |
|---|---|---|---|
| EP | 3068179 | A1 | 9/2016 |
| WO | 2013022993 | A1 | 2/2013 |
| WO | 2018202183 | A1 | 11/2018 |

OTHER PUBLICATIONS

RAN2, RAN2 agreement on UAV requirements. 3GPP TSG-RAN1 Meeting #89 Hangzhou, China, May 15-19, 2017, R1-1709652, 2 pages.

* cited by examiner

WIRELESS COMMUNICATION METHOD AND APPARATUS

CROSS-REFERENCE TO RELATED APPLICATIONS

This application is a continuation of International Application No. PCT/CN2019/119200, filed on Nov. 18, 2019, which claims priority to Chinese Patent Application No. 201811378745.6, filed on Nov. 19, 2018. The disclosures of the aforementioned applications are hereby incorporated by reference in their entireties.

TECHNICAL FIELD

This application relates to the communications field, and more specifically, to a wireless communication method and apparatus in the communications field.

BACKGROUND

Applications of an unmanned aerial vehicle, UAV for short, are penetrating into various aspects of conventional industries. As an important member of terminals in connectivity of everything in the future, the UAV shows trends of intelligent flight, broadband transmission, and diversified functions. Based on the above, to adapt to the future development trends of the UAV, a communications network that matches the trends is necessary, and a corresponding low-altitude coverage network needs to be ensured.

Therefore, a communications technology urgently needs to be provided to meet a transmission requirement of the UAV in a mobile network as much as possible.

SUMMARY

This application provides a wireless communication method and apparatus, to meet a transmission requirement of a UAV in a mobile network.

According to a first aspect, a wireless communication method is provided. The method includes:

A first network device receives first indication information from a second network device, where the first indication information is used to indicate a common pilot signal carried on a common transmission resource.

The first network device receives the common pilot signal from a first terminal device.

The first network device adjusts a receive beam in a direction of the first terminal device based on the common pilot signal.

The common pilot signal may be a signal sent by the first terminal device to at least one network device including the first network device. The common pilot signal is a signal sent for a purpose of measurement or monitoring. For example, the common pilot signal may be an SRS, and is used to measure uplink channel quality, or may be a newly designed pilot signal. This is not limited in this embodiment of this application.

The common transmission resource is a resource used to carry or transmit the common pilot signal. The at least one network device shares the common transmission resource, and receives the common pilot signal on the common transmission resource.

When a carrier (for example, a first carrier) used to receive uplink data of the first terminal device belongs to a carrier corresponding to the first network device, the first network device aligns, in a cell in which the first carrier is located, a direction of the receive beam with a direction of the UAV, to receive the uplink data of the first terminal device. When the first network device corresponds to a plurality of cells, the first network device makes, in any one of the plurality of cells other than the cell in which the first carrier is located, the direction of the receive beam avoid the direction of the first terminal device. When a carrier used to receive uplink data of the first terminal device does not belong to a carrier corresponding to the first network device, the first network device makes, in any cell corresponding to the first network device, a direction of the receive beam avoid the direction of the first terminal device.

According to the wireless communication method provided in this embodiment of this application, the second network device (for example, a dedicated station) sends, to the first terminal device (for example, a UAV) and at least one network device corresponding to a neighboring cell, the first indication information used to indicate to send the common pilot signal on the common transmission resource, so that the first terminal device sends the common pilot signal to the at least one network device on the common transmission resource, and each network device receives and demodulates the common pilot signal, and estimates the direction of the first terminal device, to adjust the receive beam in the direction of the first terminal device. In this way, interference of uplink transmission of the first terminal device to the neighboring cell can be effectively reduced.

In an embodiment, the first indication information includes pilot signal indication information, and the pilot signal indication information is used to indicate the common pilot signal.

Optionally, the first indication information includes resource indication information, and the resource indication information is used to indicate the common transmission resource.

Optionally, the method further includes:

The first network device sends a first measurement result to the second network device, where the first measurement result is used to indicate signal strength of the common pilot signal on at least one carrier, and the at least one carrier belongs to a carrier corresponding to the first network device.

Optionally, the method further includes:

The first network device receives second indication information from the second network device, where the second indication information is used to indicate a first carrier in the at least one carrier.

The first carrier includes one or more carriers, and the first carrier may be the at least one carrier, or may be a part of the at least one carrier.

Optionally, the method further includes:

The first network device receives uplink data from the first terminal device on the first carrier.

Optionally, the method further includes:

The first network device sends scheduling information to the first terminal device by using the second network device, where the scheduling information includes being used to indicate a transmission resource that carries the uplink data, and the transmission resource includes the first carrier.

The first network device sends feedback information for the uplink data to the first terminal device by using the second network device.

Therefore, scheduling information and feedback information that are for uplink data are transmitted between two network devices (for example, the first network device and the second network device), so that data transmission reliability can be effectively improved. A manner of cross-carrier scheduling and feedback between different network devices is provided, especially when the two network devices use different carriers.

According to a second aspect, a wireless communication method is provided. The method includes:

A second network device sends first indication information to a first terminal device and a first network device, where the first indication information is used to indicate a common pilot signal carried on a common transmission resource.

Optionally, the first indication information includes pilot signal indication information, and the pilot signal indication information is used to indicate the common pilot signal.

Optionally, the first indication information includes resource indication information, and the resource indication information is used to indicate the common transmission resource.

Optionally, the method further includes:

The second network device obtains a measurement result, where the measurement result is used to indicate signal strength of the common pilot signal carried on each carrier in a first carrier group, and the carrier in the first carrier group belongs to a carrier corresponding to at least one network device.

The second network device selects, based on the measurement result, a first carrier used for uplink transmission between the first terminal device and the first network device from the first carrier group, where the first network device belongs to the at least one network device.

One network device may correspond to at least one carrier. When the at least one network device transmits a signal with the first terminal device, each network device transmits a signal by using at least one carrier in the corresponding carrier. In a carrier aggregation scenario, a plurality of carriers may be used to transmit signals. In another scenario, one carrier may be used to transmit a signal. Therefore, the carrier in the first carrier group belongs to the carrier corresponding to the at least one network device, and each carrier in the first carrier group carries a signal. In other words, each carrier in the first carrier group is used to transmit a signal.

Therefore, according to the wireless communication method provided in this embodiment of this application, the second network device (for example, a dedicated station) obtains signal strength that is measured by each of the at least one network device and that is of a signal transmitted on a carrier of the network device, to select a suitable carrier (for example, the first carrier) for the first terminal device (for example, a UAV) to perform uplink transmission, thereby effectively improving reliability of uplink data transmission.

Optionally, the method further includes:

The second network device sends second indication information to the first network device, where the second indication information is used to indicate the first carrier.

Optionally, the method further includes:

The first network device sends scheduling information to the first terminal device by using the second network device, where the scheduling information includes being used to indicate a transmission resource that carries the uplink data, and the transmission resource includes the first carrier.

The first network device sends feedback information for the uplink data to the first terminal device by using the second network device.

Therefore, scheduling information and feedback information that are for uplink data are transmitted between two network devices (for example, the first network device and the second network device), so that data transmission reliability can be effectively improved. A manner of cross-carrier scheduling and feedback between different network devices is provided, especially when the two network devices use different carriers.

According to a third aspect, a wireless communication method is provided. The method includes:

A first terminal device receives first indication information from a second network device, where the first indication information is used to indicate a common pilot signal carried on a common transmission resource.

The first terminal device sends the common pilot signal to a first network device.

According to the wireless communication method provided in this embodiment of this application, the first terminal device (for example, a UAV) receives the first indication information that is used to indicate to send the common pilot signal on the common transmission resource and that is sent by the second network device, so that the first terminal device sends the common pilot signal to at least one network device on the common transmission resource, and each of the at least one network device receives and demodulates the common pilot signal, and estimates a direction of the first terminal device, to adjust a receive beam in the direction of the first terminal device. In this way, interference of uplink transmission of the first terminal device to a neighboring cell can be effectively reduced.

Optionally, the first indication information includes pilot signal indication information, and the pilot signal indication information is used to indicate the common pilot signal.

Optionally, the first indication information includes resource indication information, and the resource indication information is used to indicate the common transmission resource.

Optionally, the method further includes:

The first terminal device sends uplink data to the first network device on a first carrier in a first carrier group, where each carrier in the first carrier group carries the common pilot signal, the carrier in the first carrier group belongs to a carrier corresponding to at least one network device, and the first network device belongs to the at least one network device.

Optionally, the method further includes:

The first terminal device receives scheduling information from the first network device by using the second network device, where the scheduling information is used to indicate a transmission resource that carries the uplink data, and the transmission resource includes the first carrier.

Optionally, the method further includes:

The first terminal device receives feedback information that is for the uplink data and that is from the first network device by using the second network device.

According to a fourth aspect, a wireless communication method is provided. The method includes:

A first network device receives location information from a second network device.

The first network device adjusts a receive beam in a direction of a first terminal device based on the location information.

When a carrier (for example, a first carrier) used to receive uplink data of the first terminal device belongs to a carrier corresponding to the first network device, the first network device aligns, in a cell in which the first carrier is located, a direction of the receive beam with a direction of a UAV, to receive the uplink data of the first terminal device. When the first network device corresponds to a plurality of cells, the first network device makes, in any one of the plurality of cells other than the cell in which the first carrier is located, the direction of the receive beam avoid the direction of the first terminal device. When a carrier used to receive uplink data of the first terminal device does not belong to a carrier corresponding to the first network device, the first network device makes, in any cell corresponding to the first network device, a direction of the receive beam avoid the direction of the first terminal device.

The location information is used to determine a location of the first terminal device, for example, may be a current location of the first terminal device in three-dimensional space.

Therefore, according to the wireless communication method provided in this embodiment of this application, at least one network device obtains, by using the second network device (for example, a dedicated station), the location information used to determine the location of the first terminal device (for example, a UAV), so that the location of the first terminal device can be determined, to adjust the receive beam in the direction of the first terminal device. In this way, interference of uplink transmission of the first terminal device to a cell corresponding to the at least one network device can be effectively reduced.

Optionally, the location information includes at least one of the following:

global positioning system GPS information of the first terminal device;
height information of the first terminal device;
flight path information of the first terminal device;
flight speed information of the first terminal device; or
angle information of the first terminal device.

The GPS information of the first terminal device may indicate longitude and latitude of the first terminal device, the height information of the first terminal device may indicate a height of the first terminal device relative to the ground, the flight path information of the first terminal device may indicate a flight track of the first terminal device, the flight speed information of the first terminal device may indicate a flight speed of the first terminal device, and the angle information of the first terminal device may indicate an angle between a connection line between the first terminal device and the first network device that currently provides a service for the first terminal device and a vertical direction and an angle between the connection line and a horizontal direction. All the information may be used to estimate the current location of the first terminal device in the three-dimensional space.

As an example instead of a limitation, the location information may alternatively be a current location that is of the first terminal device in the three-dimensional space and that is determined by the first terminal device. The location of the first terminal device is sent to the first network device, so that the first network device does not need to subsequently determine the location of the first terminal device based on a plurality of types of information.

According to a fifth aspect, a wireless communication method is provided. The method includes:

A second network device sends location information to a first network device, where the location information includes at least one of the following:

global positioning system GPS information of the first terminal device;
height information of the first terminal device;
flight path information of the first terminal device;
flight speed information of the first terminal device; or
angle information of the first terminal device.

According to a sixth aspect, a wireless communication method is provided. The method includes:

A second network device obtains a measurement result, where the measurement result is used to indicate signal strength of a signal carried on each carrier in a first carrier group, the signal is a signal transmitted between a first terminal device and at least one network device, and the carrier in the first carrier group belongs to a carrier corresponding to the at least one network device.

The second network device selects, based on the measurement result, a first carrier used for uplink transmission of the first terminal device from the first carrier group.

The signal may be a common pilot signal sent by the first terminal device to a network device in a CC group, or may be a synchronization signal block (SSB) sent by a network device in a CC group to the first terminal device. The common pilot signal is a signal sent for a purpose of measurement or monitoring. For example, the common pilot signal may be a sounding reference signal (SRS), and is used to measure uplink channel quality, or may be a newly designed pilot signal. This is not limited in this embodiment of this application.

One network device may correspond to at least one carrier. When the at least one network device transmits a signal with the first terminal device, each network device transmits a signal by using at least one carrier in the corresponding carrier. In a carrier aggregation scenario, a plurality of carriers may be used to transmit signals. In another scenario, one carrier may be used to transmit a signal. Therefore, the carrier in the first carrier group belongs to the carrier corresponding to the at least one network device, and each carrier in the first carrier group carries a signal. In other words, each carrier in the first carrier group is used to transmit a signal.

The measurement result is information that is sent by the at least one network device and that is used to indicate the signal strength, and the at least one network device is the network device in the CC group.

Therefore, according to the wireless communication method provided in this embodiment of this application, the second network device (for example, a dedicated station) obtains signal strength that is measured by each of the at least one network device and that is of a signal transmitted on a carrier of the network device, to select a suitable carrier (for example, the first carrier) for the first terminal device (for example, a UAV) to perform uplink transmission, thereby effectively improving reliability of uplink data transmission.

Optionally, the signal is the common pilot signal.
Optionally, the method further includes:
The second network device sends first indication information to the first terminal device and the at least one network device, where the first indication information is used to indicate a common pilot signal carried on a common transmission resource.

Optionally, the first indication information includes pilot signal indication information, and the pilot signal indication information is used to indicate the common pilot signal.

Optionally, the first indication information includes resource indication information, and the resource indication information is used to indicate the common transmission resource.

Optionally, the method further includes:
The second network device sends second indication information to a third network device, where the second indication information is used to indicate the first carrier.

According to a seventh aspect, a wireless communication method is provided. The method includes:

A first network device receives a common pilot signal from a first terminal device on at least one carrier.

The first network device sends a first measurement result to a second network device, where the first measurement result is used to indicate signal strength of the common pilot signal on each of the at least one carrier.

Optionally, the method further includes:

The first network device receives first indication information from the second network device, where the first indication information is used to indicate the common pilot signal carried on a common transmission resource.

Optionally, the first indication information includes pilot signal indication information, and the pilot signal indication information is used to indicate the common pilot signal.

Optionally, the first indication information includes resource indication information, and the resource indication information is used to indicate the common transmission resource.

According to an eighth aspect, a wireless communication method is provided. The method includes:

A first terminal device receives first indication information from a second network device, where the first indication information is used to indicate a common pilot signal carried on a common transmission resource.

The first terminal device sends the common pilot signal to a first network device.

Optionally, the first indication information includes pilot signal indication information, and the pilot signal indication information is used to indicate the common pilot signal.

Optionally, the first indication information includes resource indication information, and the resource indication information is used to indicate the common transmission resource.

According to a ninth aspect, a wireless communication method is provided. The method includes:

A second network device receives feedback information from the first network device, where the feedback information is feedback information for uplink data that is sent by a first terminal device to the first network device.

The second network device sends the feedback information to the first terminal device.

Therefore, feedback information for uplink data is transmitted between two network devices (for example, the first network device and the second network device), so that data transmission reliability can be effectively improved. A manner of cross-carrier feedback between different network devices is provided, especially when the two network devices use different carriers.

Optionally, the method further includes:

The second network device sends scheduling information to the first terminal device, where the scheduling information is used to indicate a transmission resource that carries the uplink data.

Therefore, scheduling information for uplink data is transmitted between two network devices (for example, the first network device and the second network device), so that data transmission reliability can be effectively improved. A manner of cross-carrier scheduling between different network devices is provided, especially when the two network devices use different carriers.

According to a tenth aspect, a wireless communication method is provided. The method includes:

A first terminal device sends uplink data to a first network device.

The first terminal device receives feedback information that is for the uplink data and that is from a second network device.

Optionally, the method further includes:

The first terminal device receives scheduling information from the second network device, where the scheduling information is used to indicate a transmission resource that carries the uplink data.

According to an eleventh aspect, a wireless communication method is provided. The method includes:

A first network device receives uplink data from a first terminal device.

The first network device sends feedback information for the uplink data to a second network device.

According to a twelfth aspect, a wireless communication method is provided. The method includes:

A first terminal device detects a synchronization signal block SSB from a second network device, where the SSB includes a primary synchronization signal PSS, a secondary synchronization signal SSS, and a physical broadcast channel PBCH signal; the PSS is carried on a first time domain resource; the SSS is carried on a second time domain resource; the PBCH signal is carried on a third time domain resource; and at least two of the first time domain resource, the second time domain resource, and the third time domain resource are located in slots that are not completely the same.

The first terminal device performs downlink synchronous access based on the SSB.

In the three time domain resources, at least two time domain resources are located in slots that are completely the same. There are two explanations for this. An explanation is that, any two time domain resources are located in slots that are not completely different. In this case, the two time domain resources do not overlap. For example, the first time domain resource and the second time domain resource are used as an example. The first time domain resource may be located in a slot #1, and the second time domain resource is located in the slot #1 and a slot #2. Another explanation is that, in any two time domain resources, one time domain resource may be located in a plurality of slots, and the other time domain resource is located in a part of the plurality of slots. In other words, the time domain resource may cross slots, and a part of the two time domain resources may be located in a same slot. In this case, the resources located in the same slot may overlap, or may not overlap. For example, the first time domain resource and the second time domain resource are still used as an example. The first time domain resource may be located in a slot #1, the second time domain resource is located in the slot #1 and a slot #2, and a part of the first time domain resource and a part of the second time domain resource are both located in the slot #1.

In addition, all the three time domain resources have respective slots to which they belong, and resources (for example, symbols) in each time domain resource may be consecutive or non-consecutive. For example, a part of symbols in the third time domain resource are consecutive, and a part of symbols are non-consecutive. In an embodiment, the third time domain resource may occupy different slots.

Therefore, according to the wireless communication method provided in this embodiment of this application, a time domain location of a transmission resource that carries the SSB is designed. The at least two of the time domain resources that carry the three signals in the SSB are configured in the slots that are not completely the same. In this way, for a carrier (for example, a dedicated carrier) with a relatively narrow bandwidth, a transmission resource can be provided for the SSB. This is particularly applicable to a scenario of the carrier with the relatively narrow bandwidth.

Optionally, the at least two time domain resources are non-consecutive.

In this way, a resource that is spared may be used for another purpose. For example, the resource that is spared may be used as a control channel to carry control information.

According to a thirteenth aspect, a wireless communication method is provided. The method includes:

A second network device sends a synchronization signal block SSB to a first terminal device, where the SSB includes a primary synchronization signal PSS, a secondary synchronization signal SSS, and a physical broadcast channel PBCH signal; the PSS is carried on a first time domain resource; the SSS is carried on a second time domain resource; the PBCH signal is carried on a third time domain resource; and at least two of the first time domain resource, the second time domain resource, and the third time domain resource are located in slots that are not completely the same.

Optionally, the at least two time domain resources are non-consecutive.

According to a fourteenth aspect, a wireless communication method is provided. The method includes:

A first network device receives location information that is from a first terminal device and that is used to determine a location of the first terminal device, where the location information includes at least one of the following:

global positioning system GPS information of the first terminal device;
  height information of the first terminal device;
  flight path information of the first terminal device;
  flight speed information of the first terminal device; or
  serving beam angle information of the first terminal device.

The first network device sends a handover request to a target cell based on the location information, where the handover request is used to request the first terminal device to hand over from a source cell to the target cell, and the source cell belongs to a cell corresponding to the first network device.

The GPS information of the first terminal device may indicate longitude and latitude of the first terminal device; the height information of the first terminal device may indicate a height of the first terminal device relative to the ground; the flight path information of the first terminal device may indicate a flight track of the first terminal device; the flight speed information of the first terminal device may indicate a flight speed of the first terminal device; and the serving beam angle information of the first terminal device indicates an angle of a beam that is in a direction of the first terminal device and that is of a cell (namely, a cell of the first network device) that currently provides a service for the first terminal device, and may be used to determine an angle of the first terminal device, and the angle of the first terminal device indicates an angle between a connection line between the first terminal device and the first network device that currently provides a service for the first terminal device and a vertical direction and an angle between the connection line and a horizontal direction. All the information may be used to estimate a current location of the first terminal device in three-dimensional space.

The following describes the source cell, the target cell, and a relationship between the two cells.

The source cell belongs to the cell corresponding to the first network device. When the first network device corresponds to a plurality of cells, the source cell is one of the plurality of cells; when the first network device corresponds to one cell, the source cell is the unique cell corresponding to the first network device.

The target cell is a cell corresponding to a dedicated station, and the target cell and the source cell may correspond to a same network device, or may correspond to different network devices. When the first network device is a common station, the target cell and the source cell belong to cells corresponding to the different network devices; when the first network device is a dedicated station, and the dedicated station is different from the dedicated station corresponding to the target cell, the target cell and the source cell correspond to the different network devices; or when the first network device is a dedicated station, and the dedicated station and the dedicated station corresponding to the target cell are a same base station, the target cell and the source cell correspond to the same network device.

Therefore, according to the wireless communication method provided in this embodiment of this application, the first network device determines, by obtaining the location information used to determine the location of the first terminal device, whether to perform cell handover, and sends the handover request to the target cell when determining that the cell handover is required, thereby effectively improving accuracy of the cell handover.

Optionally, the handover request includes the location information.

Optionally, the method further includes:

The first network device sends measurement indication information to the first terminal device, where the measurement indication information is used to indicate the first terminal device to measure the location of the first terminal device.

Optionally, that the first network device sends a handover request to a target cell based on the location information includes:

When the location that is of the first terminal device and that is determined by the first network device based on the location information meets a preset condition, the first network device sends the handover request to the target cell.

The preset condition may be a threshold used to limit whether to perform the cell handover.

According to a fifteenth aspect, a wireless communication method is provided. The method includes:

A second network device receives a handover request from a first network device, where the handover request is used to request a first terminal device to hand over from a source cell to a target cell, the source cell belongs to a cell corresponding to the first network device, and the target cell belongs to a cell corresponding to the second network device.

The second network device performs random access of the first terminal device based on the handover request.

Optionally, the handover request includes location information used to determine a location of the first terminal device, where the location information includes at least one of the following:

global positioning system GPS information of the first terminal device;
  height information of the first terminal device;
  flight path information of the first terminal device;
  flight speed information of the first terminal device; or
  serving beam angle information of the first terminal device.

According to a sixteenth aspect, a wireless communication method is provided. The method includes:

A first terminal device determines location information used to determine a location of the first terminal device, where the location information includes at least one of the following:

global positioning system GPS information of the first terminal device;

height information of the first terminal device;

flight path information of the first terminal device;

flight speed information of the first terminal device; or serving beam angle information of the first terminal device.

The first terminal device sends the location information to a first network device.

Optionally, the method further includes:

The first terminal device receives measurement indication information from the first network device, where the measurement indication information is used to indicate the first terminal device to measure the location of the first terminal device.

According to a seventeenth aspect, a wireless communications apparatus is provided. The apparatus is configured to perform the method according to any embodiment of any one of the foregoing aspects. The apparatus includes a unit configured to perform the method according to any one of the embodiments of any one of the foregoing aspects.

According to an eighteenth aspect, another wireless communications apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal, and control a transmitter to send a signal. In addition, when the processor executes the instructions stored in the memory, the processor is enabled to perform the method according to any one of the embodiments of any one of the foregoing aspects.

According to a nineteenth aspect, a computer program product is provided. The computer program product includes computer program code. When the computer program code is run on a computer, the computer is enabled to perform the methods in the foregoing aspects.

According to a twentieth aspect, a computer-readable medium is provided. The computer-readable medium is configured to store a computer program, and the computer program includes instructions used to perform the methods in the foregoing aspects.

According to a twenty-first aspect, a chip is provided. The chip includes a processor. The processor is configured to invoke, from a memory, instructions stored in the memory and run the instructions, so that a communications device on which the chip is installed performs the methods in the foregoing aspects.

According to a twenty-second aspect, another chip is provided. The chip includes an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

DESCRIPTION OF EMBODIMENTS

Figure 1:
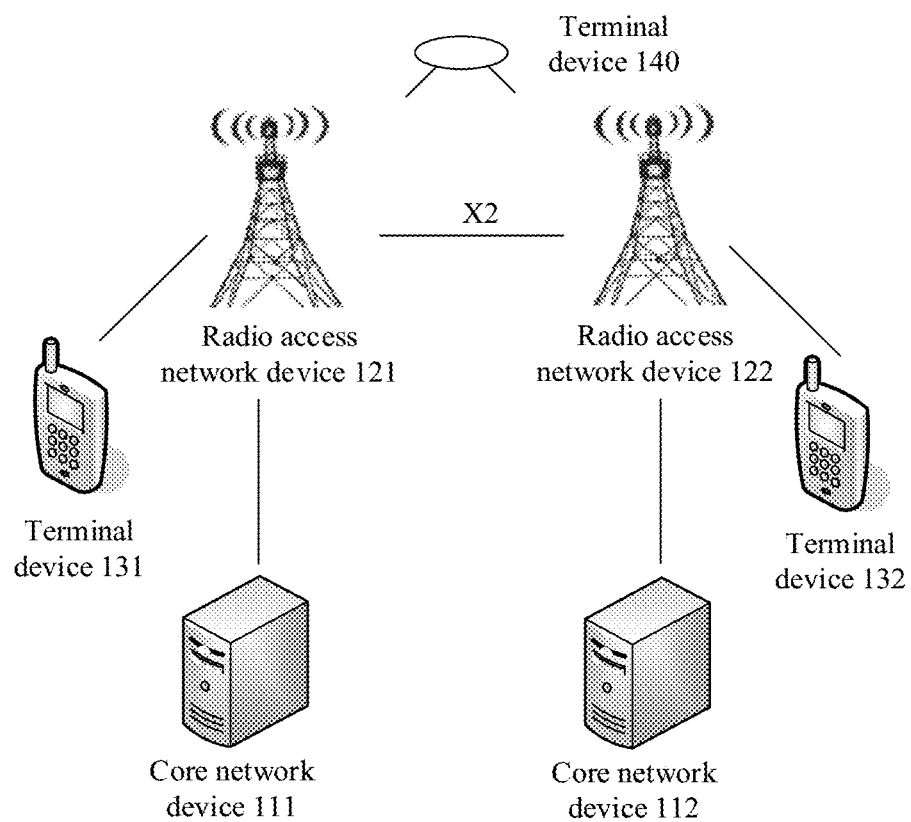
FIG. 1 is a schematic architectural diagram of a mobile communications system to which an embodiment of this application is applicable.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. The term "at least one (piece) of the following" or a similar expression thereof means any combination of these items, including any combination of one (piece) or a plurality (pieces). For example, at least one (piece) of a, b, or c may indicate the following cases: a, b, c, a and b, a and c, b and c, or a, b, and c, where a, b, and c may be singular or plural. "A belongs to B" may indicate that A is a subset of B, or may indicate that content of A is the same as content of B. "A includes B" may indicate that B is a subset of A, or may indicate that content of A is the same as content of B.

The following describes technical solutions in this application with reference to accompanying drawings.

A communications system to which the technical solutions in the embodiments of this application are applicable includes but is not limited to: a narrowband internet of things (NB-IoT) system, a long term evolution (LTE) system, a next-generation 5G mobile communications system, or a subsequently evolved communications system such as a new radio (NR) communications system.

A terminal device in the embodiments of this application may refer to a UAV, or may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device or another network device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (evolved NodeB, eNB, or eNodeB) in an LTE system, or may be a radio controller in a cloud radio access network (CRAN) scenario. Alternatively, the network device may be a relay station, an access point, a vehicle-mounted device, a wearable device, a network device in the future 5G network, a network device in the future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit ( ), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant communications software. In addition, a structure of an execution body of the method provided in the embodiments of this application is not particularly limited in the embodiments of this application, provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute the program.

FIG. 1 is a schematic architectural diagram of a mobile communications system to which an embodiment of this application is applicable. As shown in FIG. 1, the mobile communications system includes a core network device 111, a core network device 112, a radio access network device 121, a radio access network device 122, and at least one terminal device (for example, a terminal device 131, a terminal device 132, and a terminal device 140 shown in FIG. 1). The radio access network device 121 and the radio access network device 122 are connected in a wireless or wired manner. When the radio access network device 121 and the radio access network device 122 are connected in a wireless manner, wireless communication may be performed by using, for example, an X2 interface. The radio access network device 121 is connected to the core network device 111 in a wireless or wired manner. Similarly, a connection manner between the radio access network device 122, the terminal device 132, and the core network device 112 is similar to a connection manner between the radio access network device 121, the terminal device 131, and the core network device 111. In the mobile communications system, the terminal device 140 may be a UAV flying at a low altitude, and the radio access network device 121 and/or the radio access network device 122 may perform wireless communication with the terminal device 140. When both the radio access network device 121 and the radio access network device 122 perform wireless communication with the terminal device 140, uplink transmission may be performed between the radio access network device 121 and the terminal device 140, and downlink transmission may be performed between the radio access network device 122 and the terminal device 140. In addition, a core network device and a radio access network device that communicates with the core network device may be independent and different physical devices. Alternatively, a function of a core network device and a logical function of a radio access network device may be integrated into a same physical device. Alternatively, some functions of a core network device and some functions of a radio access network device may be integrated into one physical device.

It should be understood that, FIG. 1 is only a schematic diagram. The mobile communications system may further include another network device, for example, may further include a wireless relay device and a wireless backhaul device, which are not shown in FIG. 1. In addition, a quantity of core network devices, a quantity radio access network devices, and a quantity terminal devices included in the mobile communications system are not limited in this embodiment of this application.

As described in the background, to meet the future development trends of the UAV, the communications network that matches the trends needs to be provided. A current cellular mobile network supports the UAV, and faces the following important problems:

1. Asymmetrical Uplink Service and Downlink Service

There is a relatively large difference between transmission rates of uplink and downlink services of the UAV. A downlink service of the UAV is mainly transmitting some control commands and status information, and a transmission rate of the downlink service is about 60 to 100 kbps. However, an uplink service of the UAV is mainly a high-definition video, and a transmission rate of the uplink service may be, for example, about 50 Mbps. Therefore, the transmission rates of the uplink and downlink services of the UAV may differ by two to three orders of magnitude.

2. Asymmetrical Link Quality of Uplink Transmission and Downlink Transmission (1) Poor Link Quality of Downlink Transmission Because a transmission path between the UAV and a cell that provides a service for the UAV and transmission paths between the UAV and a plurality of neighboring cells are line-of-sight (LOS) transmission paths, and the paths are not blocked, the UAV receives signals from the plurality of neighboring cells during downlink transmission, and a signal to interference plus noise ratio (SINR) of downlink transmission is very low. For example, there is a 30% probability that an SINR of a UAV at a height of 150 meters is lower than −10 dB. Generally, if the SINR of downlink transmission is lower than −5 dB, network coverage is considered to be very poor, that is, the transmission link quality is poor.

(2) Good Link Quality of Uplink Transmission

In uplink transmission, although link quality of the UAV is relatively good, an uplink signal of the UAV is received by a plurality of evolved base stations. Therefore, uplink transmission of a terminal device on the ground (ground terminal device for short, for example, a mobile phone or a computer) is interfered.

3. Mobility Problem of the UAV in the Air

Due to poor low-altitude coverage of a base station, the low-altitude coverage of the base station is fragmented, and a quantity of cells that participate in cell handover of the UAV and a quantity of times of the cell handover of the UAV are increased. Consequently, transmission reliability of the UAV is severely affected, and good experience cannot be obtained.

Therefore, the embodiments of this application provide a wireless communication method. The method can be well applicable to a UAV scenario, to meet a transmission requirement of the UAV in a mobile network as much as possible, and obtain good experience.

It should be understood that, although the embodiments of this application propose the wireless communication method for a UAV scenario, this is not limited in this embodiment of this application. The embodiments of this application can be applicable to any scenario to which the embodiments of this application are applicable. In addition, for ease of description, the embodiments of this application are described in detail by using an example in which a UAV is used as a terminal device and a base station is used as a network device.

For ease of understanding, the following first briefly describes an overall design idea of the embodiments of this application.

Dedicated Station

In a conventional technology, a side lobe and a tail lobe of a base station are mainly used to cover a low-altitude area, so that low-altitude coverage quality of the base station is poor. Therefore, to improve the low-altitude coverage quality of the base station, the embodiments of this application provide a base station. For ease of differentiation, a base station that can provide relatively good low-altitude coverage quality in the embodiments of this application is denoted as a dedicated station, and a base station that can provide relatively high ground coverage quality is denoted as a common station. In addition, the common station provides low-altitude coverage quality by using a side lobe and a tail lobe of the base station, and low-altitude coverage quality is relatively poor. It should be understood that the dedicated station is short for such a base station merely for ease of description, and shall not constitute a limitation on the embodiments of this application. Any device that can provide functions of the base station in the embodiments of this application shall fall within the protection scope of the embodiments of this application. For example, because the dedicated station may provide relatively good low-altitude coverage, and the common station may provide relatively good ground coverage, the dedicated station may also be referred to as an air station, and the common station may also be referred to as a ground station.

Figure 2:
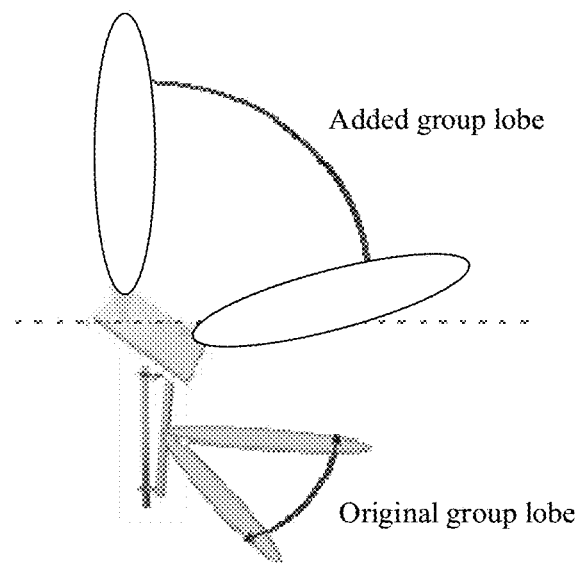
FIG. 2 is a schematic structural diagram of a dedicated station according to an embodiment of this application.

In the embodiments of this application, the dedicated station may be a base station obtained through upgrade by adding an antenna panel to the common station. As shown in FIG. 2, a group lobe may be added to a common station, so that an air antenna panel towards air is separately deployed, and coverage optimization is specially performed for a low altitude. In this way, the added group lobe is mainly responsible for low-altitude coverage, and an original group lobe is mainly responsible for ground coverage. Compared with the common station, the dedicated station can provide both better ground coverage quality and better low-altitude coverage quality.

Optionally, sparse network construction may be used for dedicated stations, and a spacing between two neighboring dedicated stations is relatively large. For example, the spacing between the dedicated stations is about 5 km. In this way, on one hand, compared with a cell provided by the common station, a cell whose network coverage is larger may be provided by the dedicated station, so that a quantity of times of cell handover performed by the UAV can be reduced, which means that transmission reliability of the UAV can be improved and good experience can be obtained. On the other hand, the spacing between the dedicated stations is relatively large, and downlink inter-cell interference in low-altitude coverage can be reduced.

Based on a design of the dedicated station, it can be learned that the dedicated station can be used not only for wireless communication of a ground terminal device, but also for wireless communication of the UAV.

Uplink Transmission and Downlink Transmission of the UAV

The following briefly describes a design idea of uplink and downlink transmission of the UAV based on the dedicated station.

In downlink transmission, a service of the UAV is mainly a control and command service. A data volume of the service is small, and theoretically few resources are used. Therefore, in air coverage, a carrier with a relatively narrow bandwidth should be used for an air-dedicated frequency. Therefore, the embodiments of this application propose that a carrier (denoted as a dedicated carrier for ease of understanding and differentiation) with a relatively narrow bandwidth is used for downlink transmission of the UAV. In this way, frequency domain resources can be saved. The dedicated carrier is provided by the dedicated station.

As an example instead of a limitation, the dedicated station may provide at least the following content by using the dedicated carrier:

a downlink common channel, such as a master information block (MIB) and a system information block (SIB), content of which can be selected based on a UAV scenario;

a physical downlink shared channel (physical downlink shared channel, PDSCH) of the UAV, where the PDSCH is mainly used to carry the control and command service of the UAV; and a physical downlink control channel (PDCCH) of the UAV, where the PDCCH may be used to carry scheduling information (or control information) for downlink data of the UAV, may be used to carry scheduling information for uplink data (or data of a large-bandwidth service) of the UAV, and may alternatively be used to carry feedback information for the uplink data of the UAV.

In addition, before downlink transmission, the UAV inevitably needs to perform uplink and downlink synchronization with and random access to the dedicated station. Therefore, the dedicated carrier may further provide an uplink common channel and an uplink dedicated channel, for example, a random access channel (RACH), a channel that carries a sounding reference signal (SRS), and a physical uplink control channel (PUCCH).

In uplink transmission, an uplink service of the UAV is a large-bandwidth service, and occupies a large amount of resources. In addition, because the UAV leaves an air serving cell for a long distance, path loss increases greatly. Therefore, it is not recommended that dedicated stations be used to provide an uplink transmission service. A main reason is: A distance difference over 10 times causes a large path loss difference, and an SINR of a signal carried on the dedicated carrier provided by the dedicated station is not high; the dedicated carrier is a carrier of a cell with large coverage, and a quantity of UAVs served by a single carrier is far greater than that of a ground cell, and consequently, an uplink bandwidth is limited and the dedicated station is overloaded. For the common station, a spacing between common stations is short. As a result, there are a large quantity of common stations. In most cases, there is a higher probability that a UAV is closer to the common station. Due to the LOS path, an SINR of the uplink transmission is not a bottleneck, and uplink interference of a serving cell to neighboring cells can be reduced in various possible manners. In addition, as a quantity of UAVs increases, a plurality of common stations may reuse resources to improve an uplink capacity of the UAVs. Finally, due to an air direct path of the UAV, an uplink SINR is generally very high. When UAV signals cause interference, the base station can relatively easily decode and cancel the interference, and the base station and ground UE can reuse the resources in a non-orthogonal manner. A non-orthogonal multiple access (NOMA) scenario is very easily constructed between the UAV and a ground terminal device, to improve resource utilization.

Therefore, in conclusion, the common station may be used for the uplink transmission of the UAV. A carrier of the common station is used to provide the uplink transmission of the UAV, and the carrier of the common station is a carrier with a large bandwidth.

To be differentiated from the dedicated carrier, in the embodiments of this application, the carrier with the large bandwidth may be referred to as a ground carrier. The ground carrier may be not only used for uplink transmission and downlink transmission of the ground terminal device, but also used for the uplink transmission of the UAV.

It should be noted that, the dedicated station can provide both relatively good ground coverage quality and relatively good low-altitude coverage quality. It means that the dedicated station can provide not only the dedicated carrier, but also the carrier with the large bandwidth. Therefore, if the dedicated station is relatively close to the UAV, the dedicated station may also be used to provide the carrier with the large bandwidth for the uplink transmission of the UAV.

In conclusion, for the UAV, the dedicated carrier of the dedicated station may be used for the downlink transmission, and the ground carrier of the dedicated station or the common station may be used for the uplink transmission.

Figure 3:
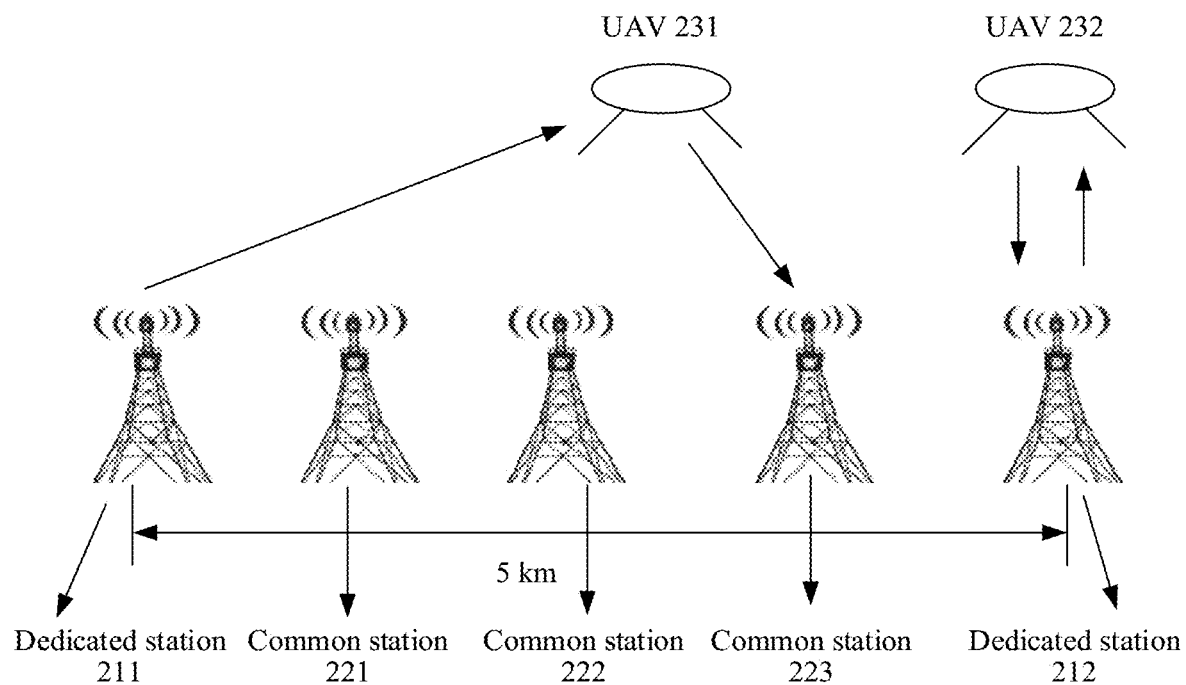
FIG. 3 is another schematic architectural diagram of a mobile communications system to which an embodiment of this application is applicable.

FIG. 3 is another schematic architectural diagram of a mobile communications system to which an embodiment of this application is applicable. FIG. 3 schematically shows three common stations and two dedicated stations. It can be learned that a spacing between the dedicated stations is greater than spacings between the common stations. A UAV 231 performs downlink transmission with a dedicated station 211, the UAV 231 performs uplink transmission with a common station 223, and a UAV 232 and a dedicated station 212 perform both uplink transmission and downlink transmission.

Serving Carrier Group

As described above, due to the impact of the air LOS path of the UAV, downlink transmission of the UAV is affected by a plurality of neighboring cells, and uplink transmission of the UAV affects a plurality of neighboring cells. Therefore, to coordinate interference between a serving cell of the UAV and neighboring cells, ground cells that can affect the UAV and be affected by the UAV can form a serving cell group, and an uplink and downlink communication design of the UAV can be considered together.

One cell includes at least one carrier, and signal transmission between any terminal device and a base station is performed on the carrier. Therefore, in the embodiments of this application, the serving cell group may alternatively be referred to as a serving carrier (CC) group, and both names may be used for description as replacement. For brevity, the serving CC group is referred to as a CC group for short hereinafter.

The CC group includes carriers in a plurality of cells, and the plurality of cells belong to a cell corresponding to at least one base station. Because the dedicated station may not only provide the dedicated carrier, but also provide the ground carrier, a base station in the CC group may not only include the common station, but also may include the dedicated station, and a quantity of common stations and a quantity of dedicated stations are not limited.

For selection of the CC group, in the embodiments of this application, the dedicated station may configure a CC group of the UAV in a semi-static manner based on related information reported by the UAV. The information may include location information of the UAV, or information about signal strength that is of an SSB carried on a carrier in the CC group and that is measured by the UAV. In addition, the CC group may be updated dynamically during a flight of the UAV.

Figure 4:
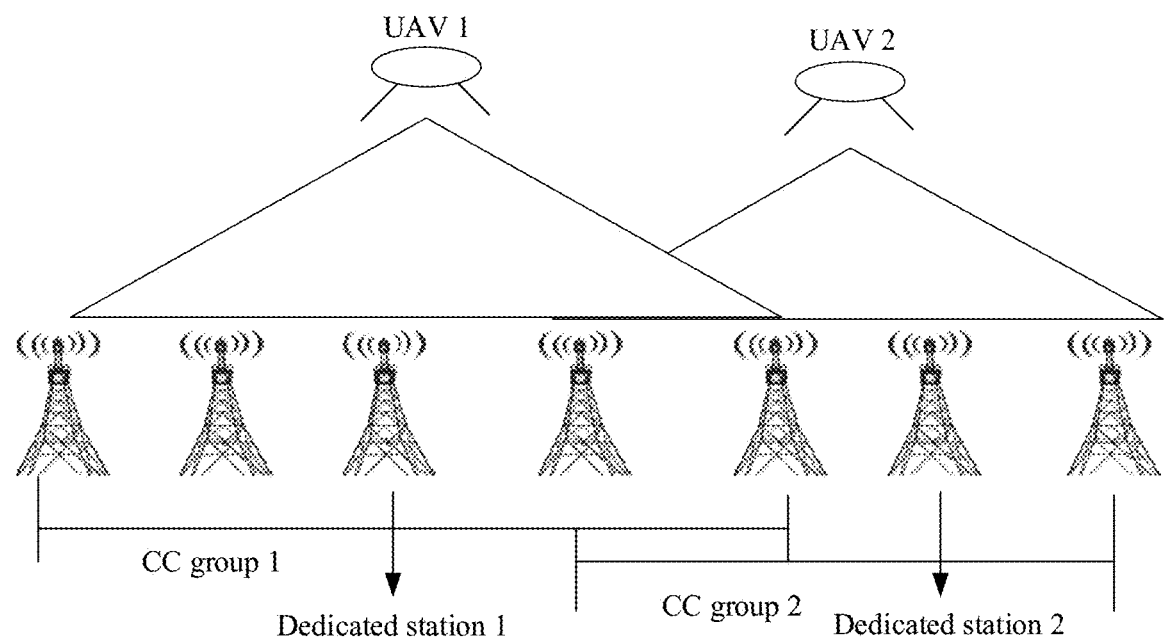
FIG. 4 is a schematic diagram of a CC group according to an embodiment of this application.

FIG. 4 is a schematic diagram of a CC group according to an embodiment of this application. As shown in FIG. 4, a CC group corresponding to a UAV 1 is a CC group 1, and base stations in the CC group 1 include a dedicated station 1 and four other common stations; a CC group corresponding to a UAV 2 is a CC group 2, and base stations in the CC group 2 include a dedicated station 2 and three other common stations.

Based on the foregoing design idea, the embodiments of this application provide, in a plurality of aspects, solutions applicable to this scenario. The following describes the embodiments of this application in detail with reference to flowcharts and structural diagrams in three major aspects: downlink transmission, uplink transmission, and a combination of the uplink transmission and the downlink transmission.

It should be emphasized again that, although the embodiments of this application are proposed based on a background of the UAV, the embodiments of this application are not limited thereto, and may also be applicable to any other scenario to which the embodiments of this application are applicable. In other words, solutions that are used in any other scenario and that are similar to this embodiment of this application shall fall within the protection scope of this application.

For example, two types of network devices (which may be similar to the common station and the dedicated station in this specification) may be defined: a first-type network device and a second-type network device. Both the first-type network device and the second-type network device may be oriented to a ground coverage scenario. To improve cell performance, for example, a frequency of a carrier used by the first-type network device may be different from a frequency of a carrier used by the second-type network device, and a bandwidth is not limited. As an example instead of a limitation, the second-type network device may use a lower frequency, to implement better ground coverage, and is used for downlink access of a terminal device. The first-type network device may use a higher frequency, and an access node of the first-type network device provides a large-bandwidth uplink service. The first-type network device and the second-type network device may have different physical station addresses, or may have a same physical station address. The terminal device may send a common pilot signal by using a common pilot signal in the first-type network device, and receive and estimate a channel by using a carrier corresponding to the first-type network device. A transmission resource of the common pilot signal may be configured by the second-type network device through downlink by using a corresponding carrier. Certainly, in this scenario, the first-type network device may alternatively use a lower frequency, and the second-type network device may use a higher frequency. Embodiments of various aspects described in the following may all be applicable to this scenario.

In the following description, an example in which a first terminal device is a UAV and a second network device is a dedicated station is used to describe the embodiments of this application. In some cases, a first network device is any network device in the CC group, and the first network device and the second network device may be a same network device. In some cases, the first network device and the second network device may not be a same network device.

I. Downlink Transmission

The following separately describes processes related to downlink transmission of the UAV in four aspects.

1. Design of a Time Domain Resource that Carries a Synchronization Signal Block (Synchronization Signal Block, SSB)

Before performing access, the UAV needs to detect a synchronization signal block (SSB) sent by the dedicated station, and then performs downlink synchronization with the dedicated station based on the SSB. Subsequently, the UAV performs uplink synchronization, and finally completes a random access process.

As described above, a dedicated carrier provided by a dedicated machine is used for downlink transmission. In the embodiments of this application, because a bandwidth of the dedicated carrier is small, to provide a transmission resource for the SSB, a transmission resource that carries the SSB may be redesigned in the embodiments of this application. A time domain resource that carries the SSB is designed. The following uses embodiments for description.

Figure 5:
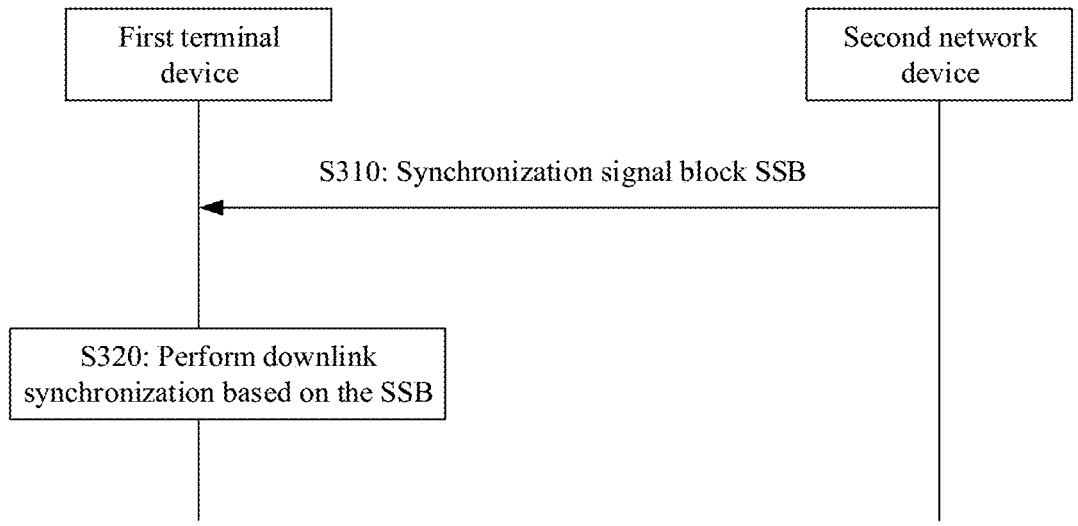
FIG. 5 is a schematic interaction diagram of a wireless communication method according to an embodiment of this application.

FIG. 5 is a schematic interaction diagram of a wireless communication method 300 according to an embodiment of this application.

S310: A second network device sends an SSB, where the SSB includes a primary synchronization signal (PSS), a secondary synchronization signal (secondary synchronization signal, SSS), and a physical broadcast channel (PBCH) signal. The PSS is carried on a first time domain resource; the SSS is carried on a second time domain resource; the PBCH signal is carried on a third time domain resource; at least two of the first time domain resource, the second time domain resource, and the third time domain resource are located in time units that are not completely the same.

S320: A first terminal device performs downlink synchronous access based on the SSB.

A length of the time unit is not limited in this embodiment of this application. One time unit may be one subframe, may be one slot, or may be one mini-slot and the like. For ease of description, an example in which a slot is used as the time unit is used to describe a relationship between the three time domain resources.

All the three time domain resources have respective slots to which they belong, and resources (for example, symbols) in each time domain resource may be consecutive or non-consecutive. For example, in the third time domain resource, a part of symbols are consecutive, and a part of symbols are non-consecutive. In an embodiment, the third time domain resource may occupy different slots. In the three time domain resources, at least two time domain resources are located in slots that are not completely the same. There are two explanations for this. An explanation is that, any two time domain resources are located in slots that are completely different. In this case, the two time domain resources do not overlap. For example, the first time domain resource and the second time domain resource are used as an example. The first time domain resource may be located in a slot #1, and the second time domain resource is located in the slot #1 and a slot #2. Another explanation is that, in any two time domain resources, one time domain resource may be located in a plurality of slots, and the other time domain resource is located in a part of the plurality of slots. In other words, the time domain resource may cross slots, and a part of the two time domain resources may be located in a same slot. In this case, the resources located in the same slot may overlap, or may not overlap. For example, the first time domain resource and the second time domain resource are still used as an example. The first time domain resource may be located in a slot #1, the second time domain resource is located in the slot #1 and a slot #2, and a part of the first time domain resource and a part of the second time domain resource are both located in the slot #1.

Optionally, all the three time domain resources are located in different slots. That is, slots in which the three time domain resources are located do not overlap.

Optionally, the at least two time domain resources are non-consecutive.

Figure 6:
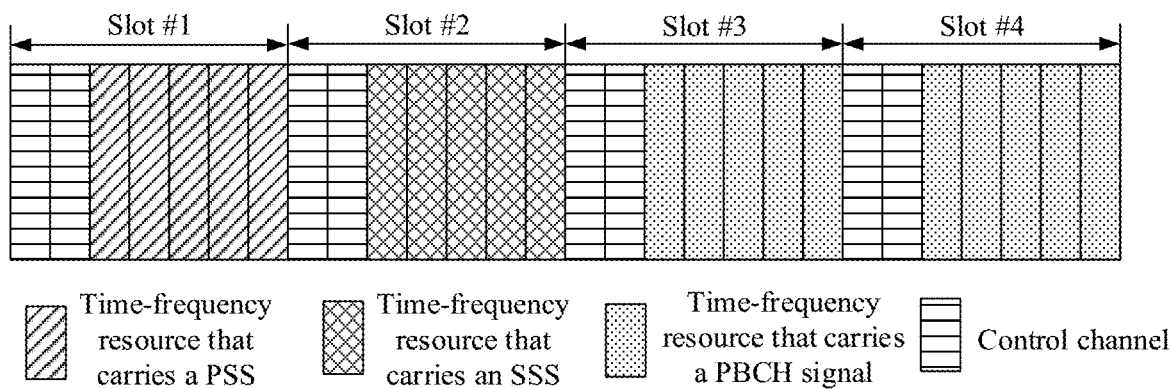
FIG. 6 is a schematic diagram of a time domain resource occupied by an SSB according to an embodiment of this application.

FIG. 6 is a schematic diagram of a time domain resource occupied by an SSB according to an embodiment of this application. As shown in FIG. 6, a PSS, an SSS, and a PBCH signal are all located in completely different slots. The PBCH signal occupies two slots, which are a slot #3 and a slot #4. Three time domain resources are non-consecutive. A resource that is spared may be used for another purpose. For example, the resource that is spared may be used as a control channel to carry control information.

Therefore, according to the wireless communication method provided in this embodiment of this application, a time domain location of a transmission resource that carries the SSB is designed. The at least two of the time domain resources that carry the three signals in the SSB are configured in the time units that are not completely the same. In this way, for a carrier (for example, a dedicated carrier) with a relatively narrow bandwidth, a transmission resource can be provided for the SSB. This is particularly applicable to a scenario in which the carrier has a relatively narrow bandwidth.

It should be noted that the foregoing description of the time domain resource that carries the SSB is not limited to a case of the dedicated carrier and is applicable to carriers of various bandwidths, and is not limited to a process in which the UAV and the dedicated station perform downlink access and is applicable to a process in which a network device and a terminal device that are of any type perform downlink access. Any solution involving separation of time units in which time domain resources that carry three signals in the SSB are located falls within the protection scope of this embodiment of this application.

2. Initial Access Process Between the UAV and an Air Cell:

In the embodiments of this application, in a process in which the UAV initially accesses an air cell, only the dedicated carrier of the dedicated station is involved, information exchanged between the dedicated station and the UAV is carried on the dedicated carrier, and the dedicated carrier provides all channels required in a process in which the UAV accesses the dedicated station. The following separately describes the random access process in two cases:

Case 1: The UAV is powered on and performs registration and access in the air.

This scenario is relatively uncommon, but the embodiments of this application still provide functions in this scenario. The dedicated station sends an SSB by using the dedicated carrier. The UAV is powered on and detects the SSB, performs downlink synchronization with the air cell, and obtains common configuration information. The common configuration information includes a configuration resource of a channel, for example, a RACH, a PUCCH, or a PDCCH, that is included in the air cell. Then, a RACH is initiated on the dedicated carrier to perform uplink synchronization and access. After the uplink synchronization and the access succeed, a non-access stratum (NAS) procedure is performed for registration and authentication, to complete the entire random access process.

Case 2: The UAV is handed over from a ground cell to the air cell when taking off from the ground.

Figure 7:
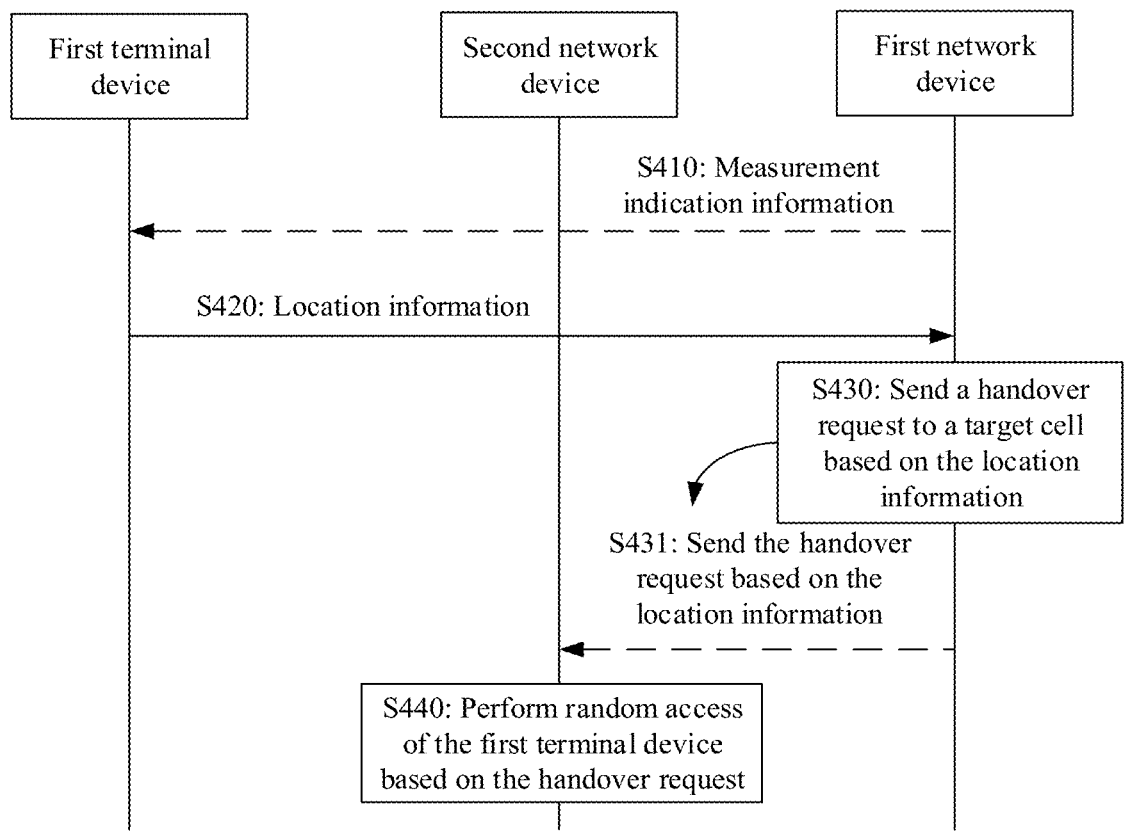
FIG. 7 is another schematic interaction diagram of a wireless communication method according to an embodiment of this application.

This is a more common scenario. FIG. 7 is another schematic interaction diagram of a wireless communication method 400 according to an embodiment of this application, and describes a schematic diagram of interaction between a UAV and a first network device, or among a UAV, a first network device, and a second network device in a process in which the UAV is handed over from a ground cell to an air cell. The first network device may be a device that provides a ground carrier (or the ground cell) for the UAV.

S420: A first terminal device sends location information that is used to determine a location of the first terminal device to the first network device, where the location information includes at least one of the following:

global positioning system GPS information of the first terminal device;
height information of the first terminal device;
flight path information of the first terminal device;
flight speed information of the first terminal device; or
serving beam angle information of the first terminal device.

S430: The first network device sends a handover request to a target cell based on the location information, where the handover request is used to request the first terminal device to hand over from a source cell to the target cell, and the source cell belongs to a cell corresponding to the first network device.

GPS information of the UAV may indicate longitude and latitude of the UAV; height information of the UAV may indicate a height of the UAV relative to the ground; flight path information of the UAV may indicate a flight track of the UAV; flight speed information of the UAV may indicate a flight speed of the UAV; and serving beam angle information of the UAV indicates an angle of a beam that is in a direction of the UAV and that is of a cell (namely, the cell of the first network device) that currently provides a service for the UAV, and may be used to determine an angle of the UAV, and the angle of the UAV indicates an angle between a connection line between the UAV and the first network device that currently provides a service for the UAV and a vertical direction and an angle between the connection line and a horizontal direction. All the information may be used to estimate a current location of the UAV in a three-dimensional space.

As an example instead of a limitation, the location information may alternatively be a current location that is of the UAV in the three-dimensional space and that is determined by the UAV. The location of the UAV is sent to the first network device, so that the first network device does not need to subsequently determine the location of the UAV based on a plurality of types of information.

The following describes the source cell, the target cell, and a relationship between the two cells.

The source cell belongs to the cell corresponding to the first network device. When the first network device corresponds to a plurality of cells, the source cell is one of the plurality of cells; when the first network device corresponds to one cell, the source cell is the unique cell corresponding to the first network device.

The target cell is a cell corresponding to a dedicated station, and the target cell and the source cell may correspond to a same network device, or may correspond to different network devices. When the first network device is a common station, the target cell and the source cell belong to cells corresponding to the different network devices; when the first network device is a dedicated station, and the dedicated station is different from the dedicated station corresponding to the target cell, the target cell and the source cell correspond to the different network devices; or when the first network device is a dedicated station, and the dedicated station and the dedicated station corresponding to the target cell are a same base station, the target cell and the source cell correspond to the same network device.

In S430, after receiving the location information sent by the UAV, the first network device may determine the location of the UAV, and determine whether to perform cell handover. After determining that cell handover needs to be performed, the first network device may select, based on a neighboring cell list of network planning and optimization, a cell (that is, the target cell) that the UAV needs to be handed over to. Then, the first network device may send a handover request to the target cell that the UAV needs to be handed over to, so that the target cell learns of that the UAV needs to perform wireless communication in the target cell. The location of the UAV may be understood as the location of the UAV in the three-dimensional space, for example, longitude, latitude, and a height of the UAV.

Optionally, the handover request includes the location information.

Optionally, that the first network device sends a handover request to a target cell based on the location information includes:

When the location that is of the first terminal device and that is determined by the first network device based on the location information meets a preset condition, the first network device sends the handover request to the target cell.

The preset condition may be an interval used to limit whether to perform the cell handover. For example, the preset condition may be an interval value. As an example instead of a limitation, the interval may include at least one of the following: a height interval/threshold, a longitude interval/threshold, a dimension interval/threshold, or an angle interval/threshold. When a parameter used to indicate the location of the UAV belongs to a value of the foregoing at least one interval/threshold, the cell handover is performed. For another example, the preset condition may also be a threshold. As an example instead of a limitation, the threshold may include a height threshold, a longitude threshold, a latitude threshold, an angle threshold, or the like.

It should be noted that, when the source cell and the target cell correspond to the different network devices, as an optional operation of S430, in S431, the first network device sends a handover request to the second network device (namely, a dedicated station). When receiving the handover request, the dedicated station performs random access of the first terminal device. The handover request may include location information of the UAV. The dedicated station adjusts an initial access beam in the target cell based on the location of the UAV, and aligns the initial access beam with an incoming direction of the UAV, so that the UAV can perform access. Subsequently, various types of signaling is transmitted between the dedicated station and the UAV through a dedicated carrier to complete an entire random access process. For the random access process of the UAV, refer to the random access process between the UAV and the dedicated station in Case 1. For brevity, details are not described herein again.

Optionally, in S410 before S420, the first network device sends measurement indication information to the first terminal device, where the measurement indication information is used to indicate the first terminal device to measure the location of the first terminal device.

The measurement indication information is used to indicate to measure the location of the UAV, and may indicate the UAV to measure parameter values of various parameters that can be used to determine the location of the UAV. For example, the parameter that the measurement indication information indicates the UAV to measure may include at least one of the following: longitude and latitude of the UAV, a height of the UAV, a flight path of the UAV, a flight speed of the UAV, and an angle of the UAV. In this way, the UAV may send the obtained various parameter values to the first network device by using the location information, or the UAV estimates the location of the UAV in the three-dimensional space based on the measured various parameter values, and directly sends the location to the first network device, so that the first network device does not need to subsequently determine the location of the UAV based on the various parameter values.

Therefore, according to the wireless communication method provided in this embodiment of this application, the first network device determines, by obtaining the location information used to determine the location of the UAV, whether to perform cell handover, and sends the handover request to the target cell when determining that the cell handover is required, thereby effectively improving accuracy of the cell handover.

3. Manner of Flexible Capacity Expansion for a Dedicated Carrier

A bandwidth of a dedicated carrier used by the UAV for downlink transmission is very limited (for example, a bandwidth of a dedicated carrier is 1 M), and PDCCHs for uplink data and downlink data of the UAV and the downlink data of the UAV are all carried on the dedicated carrier. If a quantity of UAVs increases, consequently, a bandwidth resource of a PDSCH is less than a bandwidth resource of the PDCCH, and transmission performance of the UAV is affected.

In addition, considering reasons such as a high flight speed and a large activity area of the UAV, and big changes in a quantity of UAVs and a location of the UAV in a particular area, the embodiments of this application propose three manners in which a capacity of a dedicated carrier can be flexibly expanded, flexibly adjusting a frequency domain bandwidth and/or a time domain length of the dedicated carrier, so that a spectrum resource of the dedicated carrier can be efficiently used. The following separately describes the three manners.

Manner 1

A relatively large indication bandwidth is configured for the UAV, and a bandwidth is dynamically adjusted based on the quantity of UAVs. When the quantity of UAVs is relatively small, a relatively small actual bandwidth is used for wireless communication. When the quantity of UAVs increases, a bandwidth is adjusted, and a relatively large actual bandwidth is used for communication.

Manner 2

Dedicated carriers of the UAV are dynamically added. For example, when the quantity of UAVs increases, a new dedicated carrier is added to a system.

Manner 3

A bandwidth of the dedicated carrier of the UAV and a time domain length of a control resource set CORESET are dynamically adjusted.

For a manner of adjusting the bandwidth of the dedicated carrier of the UAV, when the quantity of UAVs increases, as an example instead of a limitation, a dedicated station may send a signaling indication to the UAV to adjust the bandwidth of the dedicated carrier, for example, dynamically increase the bandwidth of the dedicated carrier from 1 M to 2 M. In this manner, the bandwidth of the dedicated carrier can be dynamically adjusted without restarting the cell.

For adjusting the time domain length of the control resource set, when the quantity of UAVs increases, as an example instead of a limitation, a control resource set with a quantity of symbols greater than three may be configured for the dedicated carrier of the UAV. The control resource set includes a resource of at least one control channel, a frequency domain resource of the at least one control channel is a dedicated carrier, and each control channel occupies more than three symbols in time domain. For example, when the PDSCH and the PDCCH can share a resource, the dedicated carrier may support a control resource set of 14 symbols. In this manner, a connection between the UAV and the dedicated station can be maintained without a call drop.

In the foregoing three manners, in the manner 1, because a large amount of neighboring cell interference exists in an LOS path of the UAV in the air, adjacent-frequency interference of dozens of cells falls into a receive channel of a filter of the UAV. Consequently, coverage quality of a downlink dedicated carrier easily deteriorate. In the manner 2, a common channel exists in each newly added dedicated carrier of the UAV, and resources are wasted. In addition, resources cannot be shared between dedicated carriers of different UAVs, and resource utilization is low. Therefore, in comprehensive consideration, the manner 3 is better.

It should be noted that the foregoing carrier bandwidth adjustment manner may be used in any possible scenario, for example, a scenario in which both the first-type network device and the second-type network device mentioned above are oriented to ground coverage. The first-type network device may be similar to the first network device herein, and the second-type network device may be similar to the second network device herein. As long as a transmission resource needs to be added based on an actual situation (for example, a quantity of terminal devices increases or a service volume of a terminal device increases), the foregoing carrier capacity expansion manner may be used. The carrier is not limited to the dedicated carrier described in the embodiments of this application, and may be a carrier of any bandwidth.

4. Isolation Between a Ground Carrier and a Dedicated Carrier

In the embodiments of this application, a ground signal may be interfered by a side lobe and a tail lobe of an air coverage signal of a dedicated station. A dedicated carrier is used for downlink transmission of the UAV, and a ground carrier is used for downlink transmission of a ground terminal device. Because air coverage affects a geographical range, a remote common station may still use all carrier bandwidths. This means that a bandwidth of the ground carrier used by the ground terminal device may overlap a bandwidth of the dedicated carrier. Therefore, in downlink transmission, to reduce interference of the downlink transmission of the UAV to the downlink transmission of the ground terminal device, the ground carrier and the dedicated carrier may be isolated from each other.

In an embodiment, in the foregoing established CC group of the UAV, the dedicated station may send indication information to a common station in the CC group, to indicate the common station in the CC group to use a carrier other than a dedicated carrier currently used by the UAV.

To better implement isolation between the ground carrier and the dedicated carrier, optionally, isolation between the ground carrier and the dedicated carrier may be implemented by using a filter.

II. Uplink Transmission

The following separately describes processes related to uplink transmission of the UAV in two aspects.

As described above, a ground carrier with a large bandwidth is used for the uplink transmission of the UAV. As an example instead of a limitation, the ground carrier with a large bandwidth is mainly used for uplink data transmission of the UAV and a common pilot signal used for interference avoidance in the CC group (for detailed description, refer to description of uplink transmission in the second aspect).

1. Manner in which the Dedicated Station Determines a Carrier Used to Receive Uplink Data in the Uplink Transmission As described above, the CC group is established to coordinate interference between a serving cell and a neighboring cell of the UAV. There are a plurality of ground carriers that can be used for the uplink transmission of the UAV in the CC group. Therefore, an appropriate ground carrier needs to be selected for the UAV from the plurality of ground carriers to transmit uplink data, and a network device corresponding to the selected ground carrier demodulates the uplink data on the ground carrier, to send the uplink data to a core network device. In the following embodiments, unless otherwise specified, a carrier in the embodiments is a ground carrier.

Figure 8:
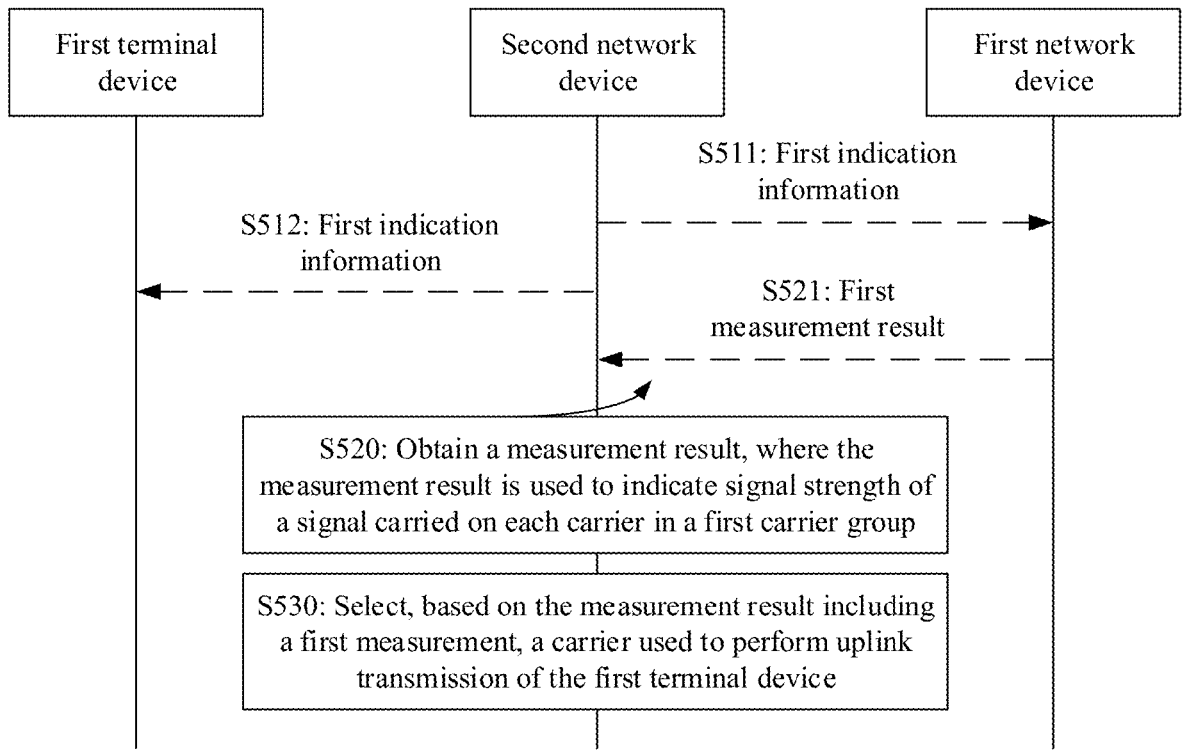
FIG. 8 is another schematic interaction diagram of a wireless communication method according to an embodiment of this application.

FIG. 8 is another schematic interaction diagram of a wireless communication method 500 according to an embodiment of this application, and describes a manner in which a dedicated station determines a carrier used to receive uplink data.

S520: A second network device obtains a measurement result, where the measurement result is used to indicate signal strength of a signal carried on each carrier in a first carrier group, the signal is a signal transmitted between a first terminal device and at least one network device, and the carrier in the first carrier group belongs to a carrier corresponding to the at least one network device.

S530: The second network device selects, based on the measurement result, a first carrier used for uplink transmission of the first terminal device from the first carrier group.

The second network device is a dedicated station, the at least one network device may be a network device in a CC group, and the at least one network device may include the dedicated station, or may not include the dedicated station.

The signal may be a common pilot signal sent by the UAV to the network device in the CC group, or may be an SSB sent by the network device in the CC group to the UAV. The common pilot signal is a signal sent for a purpose of measurement or monitoring. For example, the common pilot signal may be an SRS, and is used to measure uplink channel quality, or may be a newly designed pilot signal. This is not limited in this embodiment of this application.

One network device may correspond to at least one carrier. When the at least one network device transmits a signal with the UAV, each network device transmits a signal by using at least one carrier in the corresponding carrier. In a carrier aggregation scenario, a plurality of carriers may be used to transmit signals. In another scenario, one carrier may be used to transmit a signal. Therefore, the carrier in the first carrier group belongs to the carrier corresponding to the at least one network device, and each carrier in the first carrier group carries a signal. In other words, each carrier in the first carrier group is used to transmit a signal.

The measurement result is information that is sent by the at least one network device and that is used to indicate the signal strength, and the at least one network device is the network device in the CC group. For ease of differentiation, a measurement result of each network device is denoted as a sub measurement result.

Each network device measures signal strength of a signal transmitted on at least one carrier, to obtain the sub measurement result of each network device. When the at least one network device does not include the dedicated station, the at least one network device sends the obtained sub measurement result to the dedicated station, so that the dedicated station obtains the measurement result. When the at least one network device includes the dedicated station, a network device that is in the at least one network device and that is other than the dedicated station sends the sub measurement result to the dedicated station, and the dedicated station obtains the sub measurement result from the dedicated station, so that the dedicated station obtains the measurement result. In this way, the dedicated station selects, from the first carrier group based on the measurement result, based on the signal strength of the signal on each carrier in the first carrier group, a carrier (namely, the first carrier) with relatively good signal strength for the uplink transmission of the UAV.

Still referring to FIG. 8, S521 represents a operation in which a first network device sends the sub measurement result (for example, a first measurement result) to the dedicated station, and the first measurement result is used to indicate signal strength of a signal on each of at least one carrier. When the at least one network device in the CC group includes the dedicated station, the first network device is any network device that is in the at least one network device and that is other than the dedicated station. When the at least one network device in the CC group does not include the dedicated station, the first network device is any one of the at least one network device.

Herein, the first carrier may be one carrier, or may be a plurality of carriers. The plurality of carriers are all used to transmit uplink data, and are used in a carrier aggregation scenario. In addition, the first carrier may be all or a part of carriers used by a network device to transmit a signal. For example, a network device 1 transmits a signal by using three carriers, and a corresponding sub measurement result also indicates signal strength of the signal on the three carriers. It is assumed that the signal strength of the signal on the three carriers is very good, the dedicated station may use all the three carriers as a first carrier. Alternatively, two carriers may be used as the first carrier, and both are used in a carrier aggregation scenario. The dedicated station may also use one of the three carriers as the first carrier. Certainly, when a network device transmits a signal by using one carrier, and signal strength of the signal on the carrier is very good, this carrier is used as the first carrier, and this carrier is also all carriers used by the network device to transmit the signal.

Therefore, according to the wireless communication method provided in this embodiment of this application, the second network device (for example, the dedicated station) obtains signal strength that is measured by each of the at least one network device and that is of a signal transmitted on a carrier of the network device, to select a suitable carrier (for example, the first carrier) for the first terminal device (for example, the UAV) to perform uplink transmission, thereby effectively improving reliability of uplink data transmission.

After the dedicated station selects the first carrier, the at least one network device may learn, in different manners, of whether the at least one network device can receive the uplink data of the UAV. For ease of description, a network device corresponding to the first carrier is denoted as a third network device, and the third network device may be any one of the at least one network device.

For the third network device, when the third network device is not the dedicated station, optionally, the dedicated station sends second indication information to the third network device, and the second indication information is used to indicate the first carrier. In this way, the third network device learns of that the third network device needs to receive the uplink data of the UAV by using the first carrier. Certainly, when the third network device is the dedicated station, the second indication information does not need to be sent.

For other network devices that are in the at least one network device and that are other than the third network device, when the other network devices do not include the dedicated station, optionally, the dedicated station sends third indication information to each of the other network devices, and the third indication information is used to indicate that each network device is not allowed to receive the uplink data. Certainly, when the other network devices include the dedicated station, the dedicated station only needs to send the third indication information to a network device that is in the other network devices and that is other than the dedicated station.

As an example instead of a limitation, the dedicated station may not need to notify the other network devices. The other network devices may determine, by default based on a protocol agreement or a system setting, that the other network devices cannot receive the uplink data, provided that the other network devices do not receive information used to indicate that the other network devices can receive the uplink data.

Optionally, the signal is the common pilot signal. The common pilot signal is a signal sent by the UAV to the at least one network device.

The common pilot signal may be configured by the dedicated station. The first network device in the CC group is still used as an example. Optionally, the second network device sends first indication information to the first terminal device and the first network device, where the first indication information is used to indicate a common pilot signal carried on a common transmission resource. Refer to S511 and S512 in FIG. 8.

In other words, the dedicated station sends the first indication information to the UAV and the first network device, so that the first network device and the UAV learn of that the common pilot signal is transmitted on the common transmission resource, and the first network device and the UAV have same knowledge of the common pilot signal.

Optionally, the first indication information includes pilot signal indication information, and the pilot signal indication information is used to indicate the common pilot signal.

Optionally, the first indication information includes resource indication information, and the resource indication information is used to indicate the common transmission resource.

The common transmission resource is a resource used to carry or transmit the common pilot signal. The at least one network device shares the common transmission resource, and receives the common pilot signal on the common transmission resource.

In one case, the first indication information may include both the pilot signal indication information and the resource indication information. In another case, the first indication information may include the pilot signal indication information or the resource indication information, and may further obtain the other by using a mapping relationship between the common pilot signal and the common transmission resource. The mapping relationship may be preconfigured, or may be obtained by the UAV or the network device by using signaling.

In the above cases, all the first network devices are non-dedicated stations. Herein, a case is supplemented. When the at least one network device includes the dedicated station, it means that the first network device may be the dedicated station. In this case, the dedicated station does not need to send the first indication information.

As an example instead of a limitation, in addition to the foregoing manner of measuring signal strength of the signal, the dedicated station may further select, from the CC group based on location information that is sent by the UAV and that is used to determine a location of the UAV, a carrier in a network device closest to the UAV as the first carrier used for the uplink transmission of the UAV.

It should be noted that the foregoing manner in which the second network device determines the carrier used to receive the uplink data may also be used in any possible scenario, for example, a scenario in which both the first-type network device and the second-type network device mentioned above are oriented to ground coverage. The first-type network device may be similar to the first network device herein, and the second-type network device may be similar to the second network device herein. This is not limited in this embodiment of this application.

2. Manner of Reducing Interference of the UAV to Another Neighboring Cell in the CC Group in the Uplink Transmission In the first aspect, the dedicated station selects a carrier used for the uplink transmission for the UAV. When the UAV performs the uplink transmission, interference is caused to a neighboring cell of a cell in which the carrier used for the uplink transmission is located. To reduce the interference, the embodiments of this application provide two interference reduction manners. The following separately describes the two manners in detail.

Manner A

In this manner, at least one network device in the CC group may estimate an angle of the UAV by using a common pilot signal sent by the UAV, to adjust, in different cells, a receive beam in a direction of the UAV.

Figure 9:
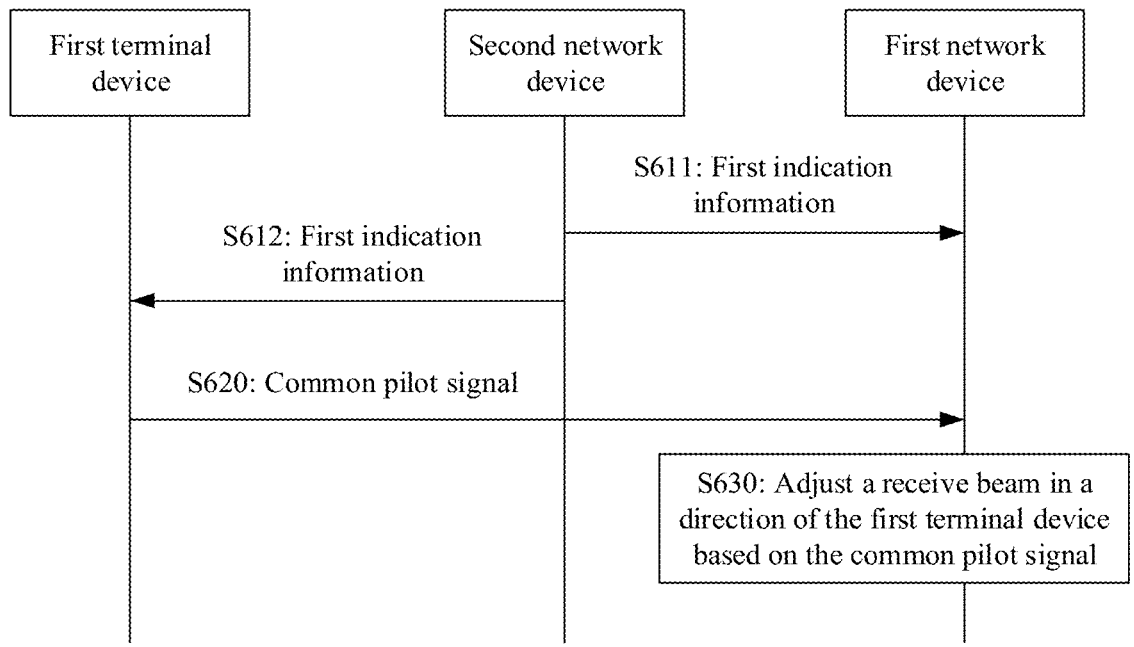
FIG. 9 is another schematic interaction diagram of a wireless communication method according to an embodiment of this application.

FIG. 9 is another schematic interaction diagram of a wireless communication method 600 according to an embodiment of this application. With reference to FIG. 9, the following describes this embodiment in detail by using the first network device in the CC group as an example. For behavior of another network device in the CC group, refer to behavior of the first network device.

In S620, a first terminal device sends the common pilot signal to the first network device.

In S630, the first network device adjusts a receive beam in a direction of the first terminal device based on the common pilot signal.

The common pilot signal is a signal sent by the UAV to at least one network device in the CC group on a common transmission resource. For the first network device, the first network device receives and demodulates the common pilot signal on the common transmission resource, and the first network device can estimate an angle direction of the UAV based on the common pilot signal, to adjust the receive beam in the direction of the first terminal device.

The following explains a process in which the first network device adjusts the receive beam in the direction of the UAV.

When a carrier (for example, the foregoing first carrier) used to receive uplink data of the UAV belongs to a carrier corresponding to the first network device, the first network device aligns, in a cell (denoted as a cell 1) in which a first carrier is located, a direction of the receive beam with the direction of the UAV, to receive the uplink data of the UAV. When the first network device corresponds to a plurality of cells, the first network device makes, in any one of the plurality of cells other than the cell 1, the direction of the receive beam avoid the direction of the UAV. When the carrier used to receive the uplink data of the UAV does not belong to the carrier corresponding to the first network device, the first network device makes, in any cell corresponding to the first network device, the direction of the receive beam avoid the direction of the UAV.

In S611 and S612, a second network device sends first indication information to the first network device and the first terminal device, where the first indication information is used to indicate the common pilot signal carried on the common transmission resource.

It should be noted herein that, in S611 and S612, when the at least one network device in the CC group includes the dedicated station, the first network device is any network device that is in the at least one network device and that is other than the dedicated station, and the dedicated station only needs to send the first indication information to a network device that is in the at least one network device and that is other than the dedicated station; when the at least one network device in the CC group does not include the dedicated station, the first network device is any one of the at least one network device.

The dedicated station indicates the common pilot signal and the common transmission resource that carries the common pilot signal to the first network device and the UAV by using the first indication information, so that the first network device and the UAV learn of that the common pilot signal is transmitted on the common transmission resource, and the first network device and the UAV have same knowledge of the common pilot signal.

Therefore, according to the wireless communication method provided in this embodiment of this application, the second network device (for example, the dedicated station) sends, to the first terminal device (for example, the UAV) and at least one network device corresponding to a neighboring cell, the first indication information used to indicate the common pilot signal sent on the common transmission resource, so that the first terminal device sends the common pilot signal to the at least one network device on the common transmission resource, and each network device receives and demodulates the common pilot signal, and estimates the direction of the first terminal device, to adjust the receive beam in the direction of the first terminal device. In this way, interference of uplink transmission of the first terminal device to the neighboring cell can be effectively reduced.

Optionally, the first indication information includes pilot signal indication information, and the pilot signal indication information is used to indicate the common pilot signal.

The first indication information includes resource indication information, and the resource indication information is used to indicate the common transmission resource.

In this embodiment of this application, content in the second aspect may be combined with content in the first aspect.

For example, in the first aspect, the third network device corresponding to the first carrier used to receive the uplink data of the UAV may be the first network device in the second aspect. In this case, when the first network device corresponds to a plurality of cells, the first network device aligns, in a cell (denoted as a cell 1) in which the first carrier is located, the direction of the receive beam with the direction of the UAV, to receive the uplink data of the UAV, and the first network device makes, in any one of the plurality of cells other than the cell 1, the direction of the receive beam avoid the direction of the UAV.

For example, the common pilot signal in the first aspect may be the common pilot signal in the second aspect. Certainly, the two common pilot signals may be different, or may be a same common pilot signal that is sent at different time points periodically or based on an event trigger.

It should be noted that the foregoing manner in which the first network device reduces interference by using the common pilot signal may also be used in any possible scenario, for example, a scenario in which both the first-type network device and the second-type network device are oriented to ground coverage. The first-type network device may be similar to the first network device herein, and the second-type network device may be similar to the second network device herein. The terminal device may send the common pilot signal by using a common pilot signal in the first-type network device, and receive and estimate a channel by using a carrier corresponding to the first-type network device. A transmission resource of the common pilot signal may be configured by the second-type network device through downlink by using a corresponding carrier. The first-type network device may increase the receive beam in the direction of the terminal device based on the common pilot signal.

Manner B

In this manner, a network device in the CC group adjusts, in different cells, a receive beam in a direction of the UAV by using location information used to determine a location of the UAV.

Figure 10:
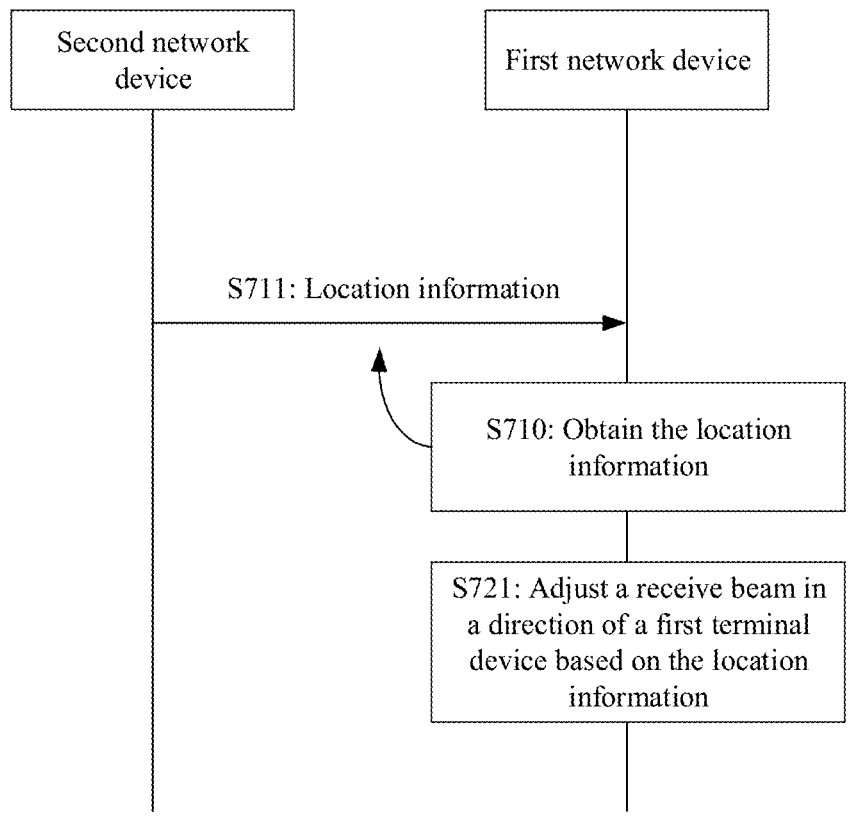
FIG. 10 is another schematic interaction diagram of a wireless communication method according to an embodiment of this application.

FIG. 10 is another schematic interaction diagram of a wireless communication method 700 according to an embodiment of this application. With reference to FIG. 10, the following describes this embodiment in detail by using the first network device in the CC group as an example. For behavior of another network device in the CC group, refer to behavior of the first network device. When the at least one network device in the CC group includes the dedicated station, the first network device is any network device that is in the at least one network device and that is other than the dedicated station, and the dedicated station only needs to send first indication information to a network device that is in the at least one network device and that is other than the dedicated station; when the at least one network device in the CC group does not include the dedicated station, the first network device is any one of the at least one network device.

In S711, a second network device sends location information that is used to determine a location of a first terminal device to the first network device.

In S721, the first network device adjusts a receive beam in a direction of the first terminal device based on the location information.

A location of a UAV may represent a location of the UAV in a three-dimensional space.

Optionally, the location information includes at least one of the following:
global positioning system GPS information of the UAV;
height information of the UAV;
flight path information of the UAV;
flight speed information of the UAV; or
angle information of the UAV.

The GPS information of the UAV may indicate longitude and latitude of the UAV; the height information of the UAV may indicate a height of the UAV relative to the ground; the flight path information of the UAV may indicate a flight track of the UAV; the flight speed information of the UAV may indicate a flight speed of the UAV; and the angle information of the UAV may indicate an angle between a connection line between the UAV and the first network device that currently provides a service for the UAV and a vertical direction and an angle between the connection line and a horizontal direction. All the information combined may be used to estimate the current location of the UAV in the three-dimensional space.

Herein, the angle information of the UAV may be an angle that is of the UAV and that is obtained by the dedicated station through measurement based on an SRS sent by the UAV in a serving cell, and other information may be information reported by the UAV to the dedicated station.

As an example instead of a limitation, the location information may alternatively be a current location that is of the UAV in the three-dimensional space and that is determined by the dedicated station. The location of the UAV is sent to the first network device, so that the first network device does not need to determine the location of the UAV based on a plurality of types of information.

In this way, the first network device can learn of the location of the UAV by using the location information, and adjust the receive beam in the direction of the first terminal device. For an explanation of adjusting the receive beam in the direction of the UAV by the first network device, refer to the explanation of adjusting the receive beam in the direction of the UAV by the first network device in the manner A. For brevity, details are not described herein again.

In the cases described above, all the first network devices are non-dedicated stations. Herein, a case is supplemented. When the at least one network device in the CC group includes the dedicated station, it means that the first network device may be the dedicated station. The dedicated station does not need to send the location information to the dedicated station. The dedicated station only needs to send the location information to a network device that is in the at least one network device and that is other than the dedicated station.

Therefore, according to the wireless communication method provided in this embodiment of this application, the at least one network device obtains, by using the second network device (for example, the dedicated station), location information used to determine the location of the first terminal device (for example, the UAV), so that the location of the UAV can be determined, to adjust the receive beam in the direction of the first terminal device. In this way, interference of uplink transmission of the first terminal device to a cell corresponding to the at least one network device can be effectively reduced.

It should be noted that the foregoing manner in which the first network device reduces interference by using the location of the first terminal device may also be used in any possible scenario, for example, a scenario in which both the first-type network device and the second-type network device mentioned above are oriented to ground coverage. The first-type network device may be similar to the first network device herein, and the second-type network device may be similar to the second network device herein. This is not limited in this embodiment of this application.

3. Combination of Uplink Transmission and Downlink Transmission

As described above, a ground carrier is used for uplink transmission of the UAV, and the ground carrier may be provided by a dedicated station or a common station. A dedicated carrier is used for downlink transmission of the UAV, and the dedicated carrier can only be provided by the dedicated station. For a same UAV, there is still a high probability that network devices used for the uplink transmission and the downlink transmission are not a same network device, and interaction behavior between the two network devices may need to be defined.

Figure 11:
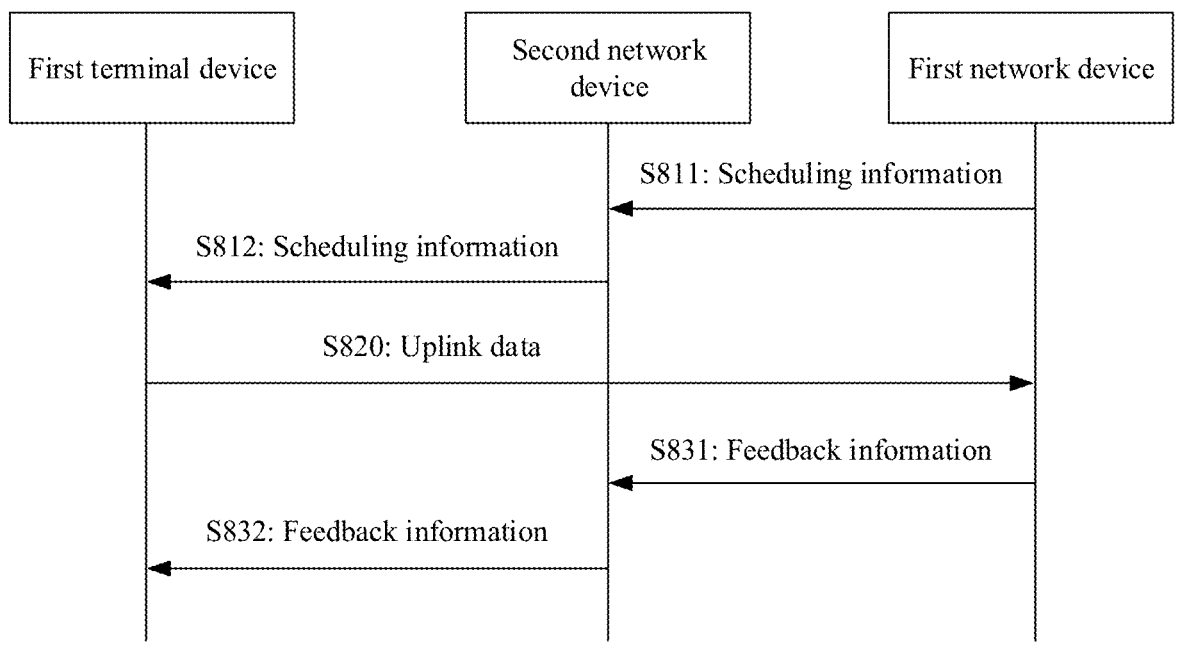
FIG. 11 is still another schematic interaction diagram of a wireless communication method according to an embodiment of this application.

FIG. 11 is still another schematic interaction diagram of a wireless communication method 800 according to an embodiment of this application. A first network device shown in FIG. 11 may be a common station, and a second network device may be a dedicated station.

In S811, the first network device sends scheduling information to the second network device, and the scheduling information is used to indicate a transmission resource that carries uplink data.

In S812, the second network device sends the scheduling information to a first terminal device.

In S820, the first terminal device sends the uplink data to the first network device.

In S831, the first network device sends feedback information for the uplink data to the second network device. The feedback information is used to indicate whether the first network device successfully receives the uplink data. The feedback information may be an ACK or a NACK. The ACK indicates that the reception succeeds, and the NACK indicates that the reception fails.

In S832, the second network device forwards the feedback information to the first terminal device.

In other words, for content related to the uplink data sent by the UAV, because channel quality of a PDCCH of the common station for the UAV is very poor, the common station cannot directly interact with the UAV. Therefore, the dedicated station forwards, to the UAV by using the dedicated carrier, scheduling information sent by the common station to the UAV. In addition, after the common station demodulates and decodes the uplink data sent by the UAV by using the ground carrier, the dedicated station can forward the feedback information to the UAV at an agreed time point by using the dedicated carrier.

In this way, the scheduling information and the feedback information that are for the uplink data are transmitted between two network devices, so that data transmission reliability can be effectively improved. A manner of cross-carrier scheduling and feedback between different network devices is provided, especially when the two network devices use different carriers.

In this embodiment of this application, the solution in which the second network device forwards the scheduling information and the feedback information that are for the UAV and that are sent by the first network device may be combined with the first aspect and content of the first aspect in the uplink transmission.

For example, in the first aspect of the uplink transmission, the first carrier used to receive the uplink data may be the ground carrier used by the first network device herein. The third network device in the foregoing description may be the first network device herein. In addition, when the first network device corresponds to a plurality of cells, the first network device aligns, in a cell (denoted as a cell 1) in which the first carrier is located, the direction of the receive beam with the direction of the UAV, to receive the uplink data of the UAV, and the first network device makes, in any one of the plurality of cells other than the cell 1, the direction of the receive beam avoid the direction of the UAV.

It should be noted that the foregoing manner in which the first network device transmits information with the first terminal device by using the second network device may also be used in any possible scenario, for example, a scenario in which both the first-type network device and the second-type network device mentioned above are oriented to ground coverage. The first-type network device may be similar to the first network device herein, and the second-type network device may be similar to the second network device herein. This is not limited in this embodiment of this application.

It should be understood that sequence numbers of the foregoing processes do not indicate an execution sequence. The execution sequence of the processes should be determined based on functions and internal logic of the processes, and should not be construed as any limitation on an implementation process of this embodiment of this application.

The foregoing describes in detail the wireless communication methods according to the embodiments of this application with reference to FIG. 1 to FIG. 11. The following describes in detail wireless communications apparatuses according to the embodiments of this application with reference to FIG. 12 and FIG. 13.

Figure 12:
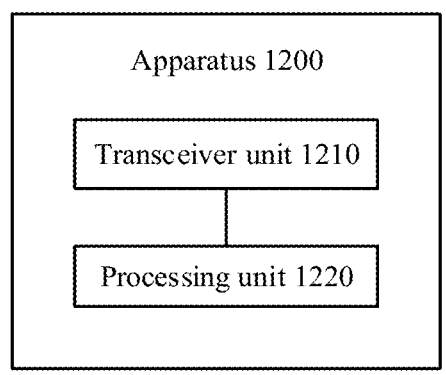
FIG. 12 is a schematic block diagram of a wireless communications apparatus according to an embodiment of this application.

FIG. 12 shows a wireless communications apparatus 1200 according to an embodiment of this application. The apparatus 1200 may be any one of a first network device, a second network device, or a first terminal device, or may be a chip in the first network device, a chip in the second network device, or a chip in the first network device. The apparatus 1200 includes a transceiver unit 1210 and a processing unit 1220.

In an embodiment, the apparatus 1200 is configured to perform procedures and operations corresponding to the first terminal device in the method 300.

The processing unit 1220 is configured to detect a synchronization signal block SSB from a second network device, where the SSB includes a primary synchronization signal PSS, a secondary synchronization signal SSS, and a physical broadcast channel PBCH signal; the PSS is carried on a first time domain resource; the SSS is carried on a second time domain resource; the PBCH signal is carried on a third time domain resource; and at least two of the first time domain resource, the second time domain resource, and the third time domain resource are located in slots that are not completely the same.

The processing unit 1220 is further configured to perform downlink synchronous access based on the SSB.

Optionally, the at least two time domain resources are non-consecutive.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the second network device in the method 300.

The transceiver unit 1210 is configured to send a synchronization signal block SSB to a first terminal device, where the SSB includes a primary synchronization signal PSS, a secondary synchronization signal SSS, and a physical broadcast channel PBCH signal; the PSS is carried on a first time domain resource; the SSS is carried on a second time domain resource; the PBCH signal is carried on a third time domain resource; and at least two of the first time domain resource, the second time domain resource, and the third time domain resource are located in slots that are not completely the same.

Optionally, the at least two time domain resources are non-consecutive.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first network device in the method 400.

The transceiver unit 1210 is configured to: receive location information that is from a first terminal device and that is used to determine a location of the first terminal device, where the location information includes at least one of the following:

global positioning system GPS information of the first terminal device;

height information of the first terminal device;

flight path information of the first terminal device;

flight speed information of the first terminal device; or angle information of the first terminal device; and send a handover request to a target cell based on the location information, where the handover request is used to request the first terminal device to hand over from a source cell to the target cell, and the source cell belongs to a cell corresponding to the first network device.

Optionally, the handover request includes the location information.

Optionally, the transceiver unit 1210 is further configured to:

send measurement indication information to the first terminal device, where the measurement indication information is used to indicate the first terminal device to measure the location of the first terminal device.

Optionally, the transceiver unit 1210 is configured to:

when the location that is of the first terminal device and that is determined by the processing unit 1220 based on the location information meets a preset condition, send the handover request to the target cell.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the second network device in the method 400.

The transceiver unit 1210 is configured to receive a handover request from a first network device, where the handover request is used to request the first terminal device to hand over from a source cell to a target cell, the source cell belongs to a cell corresponding to the first network device, and the target cell belongs to a cell corresponding to the second network device. The handover request includes location information used to determine a location of the first terminal device, where the location information includes at least one of the following:

global positioning system GPS information of the first terminal device;
height information of the first terminal device;
flight path information of the first terminal device;
flight speed information of the first terminal device; or
serving beam angle information of the first terminal device.

The processing unit 1220 is configured to perform random access of the first terminal device based on the handover request.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first terminal device in the method 400.

The processing unit 1220 is configured to determine location information used to determine a location of the first terminal device, where the location information includes at least one of the following:

global positioning system GPS information of the first terminal device;
height information of the first terminal device;
flight path information of the first terminal device;
flight speed information of the first terminal device; or
serving beam angle information of the first terminal device.

The transceiver unit 1210 is configured to send the location information to a first network device.

Optionally, the transceiver unit 1210 is further configured to:
receive measurement indication information from the first network device, where the measurement indication information is used to indicate the first terminal device to measure the location of the first terminal device.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the second network device in the method 500.

The transceiver unit 1210 is configured to obtain a measurement result, where the measurement result is used to indicate signal strength of a signal carried on each carrier in a first carrier group, the signal is a signal transmitted between a first terminal device and a plurality of network devices, and the carrier in the first carrier group belongs to a carrier corresponding to the plurality of network devices.

The processing unit 1220 is configured to select, based on the measurement result, a first carrier used for uplink transmission of the first terminal device from the first carrier group.

Optionally, the signal is a common pilot signal.

Optionally, the transceiver unit 1210 is further configured to:
send first indication information to the first terminal device and the plurality of network devices, where the first indication information is used to indicate a common pilot signal carried on a common transmission resource.

Optionally, the first indication information includes pilot signal indication information, and the pilot signal indication information is used to indicate the common pilot signal.

Optionally, the first indication information includes resource indication information, and the resource indication information is used to indicate the common transmission resource.

Optionally, the transceiver unit 1210 is further configured to:
send second indication information to a third network device, where the second indication information is used to indicate the first carrier.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first network device in the method 500.

The transceiver unit 1210 is configured to:
receive a common pilot signal from a first terminal device on at least one carrier; and
send a first measurement result to a second network device, where the first measurement result is used to indicate signal strength of the common pilot signal on each of the at least one carrier.

Optionally, the transceiver unit 1210 is further configured to:
receive first indication information from the second network device, where the first indication information is used to indicate the common pilot signal carried on a common transmission resource.

Optionally, the first indication information includes pilot signal indication information, and the pilot signal indication information is used to indicate the common pilot signal.

Optionally, the first indication information includes resource indication information, and the resource indication information is used to indicate the common transmission resource.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first terminal device in the method 500.

The transceiver unit 1210 is configured to:
receive first indication information from a second network device, where the first indication information is used to indicate a common pilot signal carried on a common transmission resource; and
send the common pilot signal to a plurality of network devices.

Optionally, the first indication information includes pilot signal indication information, and the pilot signal indication information is used to indicate the common pilot signal.

Optionally, the first indication information includes resource indication information, and the resource indication information is used to indicate the common transmission resource.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first network device in the method 600.

The transceiver unit 1210 is configured to receive first indication information from a second network device, where the first indication information is used to indicate a common pilot signal carried on a common transmission resource.

The transceiver unit 1210 is further configured to receive the common pilot signal from a first terminal device.

The processing unit 1220 is configured to adjust a receive beam in a direction of the first terminal device based on the common pilot signal.

Optionally, the first indication information includes pilot signal indication information, and the pilot signal indication information is used to indicate the common pilot signal.

Optionally, the first indication information includes resource indication information, and the resource indication information is used to indicate the common transmission resource.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the second network device in the method 600.

The transceiver unit 1210 is configured to send first indication information to a first terminal device and a plurality of network devices, where the first indication information is used to indicate a common pilot signal carried on a common transmission resource.

Optionally, the first indication information includes pilot signal indication information, and the pilot signal indication information is used to indicate the common pilot signal.

Optionally, the first indication information includes resource indication information, and the resource indication information is used to indicate the common transmission resource.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first terminal device in the method 600.

The transceiver unit 1210 is configured to:
receive first indication information from a second network device, where the first indication information is used to indicate a common pilot signal carried on a common transmission resource; and
send the common pilot signal to a plurality of network devices.

Optionally, the first indication information includes pilot signal indication information, and the pilot signal indication information is used to indicate the common pilot signal.

Optionally, the first indication information includes resource indication information, and the resource indication information is used to indicate the common transmission resource.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first network device in the method 700.

The transceiver unit 1210 is configured to receive location information that is from a second network device and that is used to determine a location of a first terminal device.

The processing unit 1220 is configured to adjust a receive beam in a direction of the first terminal device based on the location information.

Optionally, the location information includes at least one of the following:
global positioning system GPS information of the first terminal device;
height information of the first terminal device;
flight path information of the first terminal device;
flight speed information of the first terminal device; or
angle information of the first terminal device.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the second network device in the method 700.

The transceiver unit 1210 is configured to send location information that is used to determine a location of the first terminal device to a first network device, where the location information includes at least one of the following:
global positioning system GPS information of the first terminal device;
height information of the first terminal device;
flight path information of the first terminal device;
flight speed information of the first terminal device; or
angle information of the first terminal device.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the second network device in the method 800.

The transceiver unit 1210 is configured to:
receive feedback information from a first network device, where the feedback information is feedback information for uplink data that is sent by a first terminal device to the first network device; and
send the feedback information.

Optionally, the transceiver unit 1210 is further configured to:
send scheduling information to the first terminal device, where the scheduling information is used to indicate a transmission resource that carries the uplink data.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first terminal device in the method 800.

The transceiver unit 1210 is configured to:
send uplink data to a first network device; and
receive feedback information that is for the uplink data and that is from a second network device.

Optionally, the transceiver unit 1210 is further configured to:
receive scheduling information from the second network device, where the scheduling information is used to indicate a transmission resource that carries the uplink data.

It should be understood that a process in which each unit performs the foregoing corresponding operations has been described in detail in the foregoing method embodiments. For brevity, details are not described herein again.

In another embodiment, the apparatus 1200 is configured to perform procedures and operations corresponding to the first network device in the method 800.

The transceiver unit 1210 is configured to:
receive uplink data from a first terminal device; and
send feedback information for the uplink data to a second network device.

It should be understood that, the apparatus 1200 herein is presented in a form of a functional unit. The term "unit" herein may refer to an application specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the apparatus 1200 may be the first network device, the second network device, or the first terminal device in the foregoing embodiments, and the apparatus 1200 may be configured to perform procedures and/or operations corresponding to the first network device, the second network device, or the first terminal device in the foregoing method embodiments. To avoid repetition, details are not described herein again.

The apparatus 1200 in each foregoing solution has functions of implementing corresponding operations performed by the first network device, the second network device, or the first terminal device in the foregoing methods. The function may be implemented by hardware, or may be implemented by hardware executing corresponding software. The hardware or the software includes one or more modules corresponding to the foregoing function. For example, the transceiver unit may be replaced with a transmitter and a receiver, and another unit such as the processing unit 1220 may be replaced with a processor, to separately perform a sending and receiving operation and a related processing operation in the method embodiments. In addition, the transceiver unit in the apparatus 1200 may alternatively include a sending unit and a receiving unit. For performing operations related to receiving, a function of the transceiver unit may be understood as a receiving operation performed by the receiving unit, and for performing operations related to sending, the function of the transceiver unit may be understood as a sending operation performed by the sending unit.

In this embodiment of this application, the apparatus in FIG. 12 may alternatively be a chip or a chip system, for example, a system on chip (SoC). Correspondingly, the transceiver unit may be a transceiver circuit of the chip. This is not limited herein.

Figure 13:
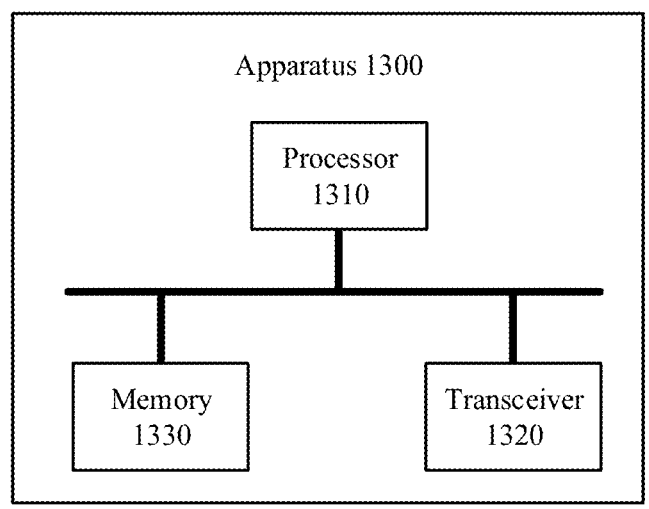
FIG. 13 is a schematic structural diagram of a wireless communications apparatus according to an embodiment of this application.

FIG. 13 shows another wireless communications apparatus 1300 according to an embodiment of this application. It should be understood that the apparatus 1300 may be the first network device, the second network device, or the first terminal device in the foregoing embodiments, and may be configured to perform operations and/or procedures corresponding to the first network device, the second network device, or the first terminal device in the foregoing method embodiments.

The apparatus 1300 includes a processor 1310, a transceiver 1320, and a memory 1330. The processor 1310, the transceiver 1320, and the memory 1330 communicate with each other by using an internal connection path. The processor 1310 may implement functions of the processing unit 1220 in various embodiments of the apparatus 1200. The transceiver 1320 may implement functions of the transceiver unit 1210 in various embodiments of the apparatus 1200. The memory 1330 is configured to store instructions, and the processor 1310 is configured to execute the instructions stored in the memory 1330. In other words, the processor 1310 may invoke the stored instructions to implement a function of the processor 1220 in the apparatus 1200, to control the transceiver 1320 to send a signal and/or receive a signal.

Optionally, the memory 1330 may include a read-only memory and a random access memory, and provide instructions and data to the processor. A part of the memory may further include a non-volatile random access memory. For example, the memory may further store information about a device type. The processor 1310 may be configured to execute the instructions stored in the memory. When the processor 1310 executes the instructions stored in the memory, the processor 1310 is configured to perform each operation and/or procedure in the method embodiments corresponding to the first network device, the second network device, or the first terminal device.

It should be understood that in the embodiments of this application, the processor in the foregoing apparatus may be a central processing unit (CPU), or the processor may be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, operations in the foregoing methods can be implemented by using a hardware integrated logic circuit in a processor, or by using instructions in a form of software. The operations of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the operations in the foregoing methods in combination with the hardware of the processor. To avoid repetition, details are not described herein again.

A person of ordinary skill in the art may be aware that units, algorithms, and operations in the examples described with reference to the embodiments disclosed in this specification can be implemented by electronic hardware or a combination of computer software and electronic hardware. Whether the functions are performed in a manner of hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the apparatus embodiments described above are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, the functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of wireless communication, wherein the method comprises:
    receiving, by a first network device, first indication information from a second network device, wherein the first indication information indicates a common pilot signal carried on a common transmission resource;
    receiving, by the first network device, the common pilot signal from a first terminal device;
    adjusting, by the first network device, a receive beam in a direction of the first terminal device based on the common pilot signal; and
    sending, by the first network device, a first measurement result to the second network device, wherein the first measurement result indicates signal strength of the common pilot signal on at least one carrier, and the at least one carrier belongs to a carrier corresponding to the first network device.

2. The method according to claim 1, wherein the first indication information comprises pilot signal indication information, and the pilot signal indication information indicates the common pilot signal.

3. The method according to claim 1, wherein the first indication information comprises resource indication information, and the resource indication information indicates the common transmission resource.

4. The method according to claim 1, wherein the method further comprises:
    receiving, by the first network device, second indication information from the second network device, wherein the second indication information indicates a first carrier in the at least one carrier; and
    receiving, by the first network device, uplink data from the first terminal device on the first carrier.

5. The method according to claim 4, wherein the method further comprises:
    sending, by the first network device, scheduling information to the first terminal device by using the second network device, wherein the scheduling information comprises a transmission resource that carries the uplink data, and the transmission resource comprises the first carrier; and
    sending, by the first network device, feedback information for the uplink data to the first terminal device by using the second network device.

6. A method of wireless communication, wherein the method comprises:
    sending, by a second network device, first indication information to a first terminal device and a first network device, wherein the first indication information indicates a common pilot signal carried on a common transmission resource, wherein an angle direction of the first terminal device is determined based on the common pilot signal; and
    obtaining, by the second network device, a measurement result, wherein the measurement result indicates signal strength of the common pilot signal carried on each carrier in a first carrier group, the carrier in the first carrier group belongs to a carrier corresponding to at least one network device, and the first network device belongs to the at least one network device.

7. The method according to claim 6, wherein the first indication information comprises pilot signal indication information, and the pilot signal indication information indicates the common pilot signal.

8. The method according to claim 6, wherein the first indication information comprises resource indication information, and the resource indication information indicates the common transmission resource.

9. The method according to claim 6, wherein the method further comprises:
- selecting, by the second network device based on the measurement result, a first carrier used for uplink transmission between the first terminal device and the first network device from the first carrier group; and
- sending, by the second network device, second indication information to the first network device, wherein the second indication information indicates the first carrier.

10. The method according to claim 9, wherein the method further comprises:
- sending, by the second network device to the first terminal device, scheduling information from the first network device, wherein the scheduling information comprises a transmission resource that carries uplink data, and the transmission resource comprises the first carrier; and
- sending, by the second network device to the first terminal device, feedback information that is for the uplink data and that is from the first network device.

11. A wireless communication method, wherein the method comprises:
- receiving, by a first terminal device, first indication information from a second network device, wherein the first indication information indicates a common pilot signal carried on a common transmission resource, wherein an angle direction of the first terminal device is determined based on the common pilot signal;
- sending, by the first terminal device, the common pilot signal to a first network device;
- receiving, by the first terminal device, scheduling information from the first network device by using the second network device, wherein the scheduling information indicates a transmission resource that carries the uplink data, and the transmission resource comprises the first carrier; and
- receiving, by the first terminal device, feedback information that is for the uplink data and that is from the first network device by using the second network device.

12. The method according to claim 11, wherein the first indication information comprises pilot signal indication information, and the pilot signal indication information indicates the common pilot signal.

13. The method according to claim 11, wherein the first indication information comprises resource indication information, and the resource indication information indicates the common transmission resource.

14. The method according to claim 11, wherein the method further comprises:
- sending, by the first terminal device, uplink data to the first network device on a first carrier in a first carrier group, wherein each carrier in the first carrier group carries the common pilot signal, the carrier in the first carrier group belongs to a carrier corresponding to at least one network device, and the first network device belongs to the at least one network device.

* * * * *